(12) United States Patent
Schuller

(10) Patent No.: US 12,190,899 B2
(45) Date of Patent: Jan. 7, 2025

(54) APPARATUS AND METHOD FOR ACQUIRING A PLURALITY OF AUDIO SIGNALS ASSOCIATED WITH DIFFERENT SOUND SOURCES

(71) Applicants: Fraunhofer-Gesellschaft zur Förderung der angewandten Forschung e.V., Munich (DE); Technische Universität Ilmenau, Ilmenau (DE)

(72) Inventor: Gerald Schuller, Ilmenau (DE)

(73) Assignees: Fraunhofer-Gesellschaft zur Förderung der angewandten Forschung e. V., Munich (DE); Technische Universität Ilmenau, Ilmenau (DE)

( * ) Notice: Subject to any disclaimer, the term of this patent is extended or adjusted under 35 U.S.C. 154(b) by 259 days.

(21) Appl. No.: 17/657,600

(22) Filed: Mar. 31, 2022

(65) Prior Publication Data

US 2022/0230652 A1 Jul. 21, 2022

Related U.S. Application Data

(63) Continuation of application No. PCT/EP2020/077716, filed on Oct. 2, 2020.

(30) Foreign Application Priority Data

Oct. 4, 2019 (EP) ..................................... 19201575

(51) Int. Cl.
*G10L 21/0272* (2013.01)
*G06N 5/01* (2023.01)
*G06N 7/01* (2023.01)

(52) U.S. Cl.
CPC ............ *G10L 21/0272* (2013.01); *G06N 5/01* (2023.01); *G06N 7/01* (2023.01)

(58) Field of Classification Search
CPC ........ G10L 21/0272; G06N 5/01; G06N 7/01; H04M 3/568
See application file for complete search history.

(56) References Cited

U.S. PATENT DOCUMENTS 9,420,368 B2 * 8/2016 Stein ...................... H04R 1/326
2006/0233389 A1 * 10/2006 Mao ........................ H04R 3/005
381/92

(Continued)

FOREIGN PATENT DOCUMENTS

| JP | 2009540378 A | 11/2009 |
|----|--------------|---------|
| JP | 2017032905 A | 2/2017 |
| KR | 20180079975 A | 7/2018 |

OTHER PUBLICATIONS

Aichner, Robert, et al. "A real-time blind source separation scheme and its application to reverberant and noisy acoustic environments." Signal Processing 86.6 (2006): 1260-1277. (online Oct. 21, 2005) (18 pages).

(Continued)

*Primary Examiner* — Michael N Opsasnick
(74) *Attorney, Agent, or Firm* — Perkins Coie LLP; Michael A. Glenn

(57) ABSTRACT

Methods, apparatus and techniques for acquiring output signals associated with different sources (such as audio sources) are presented. A first input signal is combined with a delayed and scaled version of a second input signal, to acquire a first output signal. A second input signal is combined with a delayed and scaled version of the first input signal, to acquire a second output signal. Using a random direction optimization, scaling values (forming a candidates' vector) are determined by iteratively modifying the candi- (Continued)

dates' vector. A Kullback-Leibler divergence is measured. The first output signal and the second output signal are selected to be those measurements associated with the candidate parameters associated with Kullback-Leibler divergence which indicates lowest similarity.

25 Claims, 10 Drawing Sheets

(56) References Cited

U.S. PATENT DOCUMENTS

| | | | | |
|---|---|---|---|---|
| 2006/0239471 | A1* | 10/2006 | Mao | H04R 29/005 381/92 |
| 2006/0269073 | A1 | 11/2006 | Mao | |
| 2007/0025562 | A1* | 2/2007 | Zalewski | H04R 3/005 381/92 |
| 2010/0232621 | A1 | 9/2010 | Aichner et al. | |
| 2010/0241433 | A1* | 9/2010 | Herre | G10L 19/022 704/500 |
| 2015/0086038 | A1 | 3/2015 | Stein et al. | |
| 2015/0156578 | A1* | 6/2015 | Alexandridis | H04R 3/005 381/92 |
| 2016/0071526 | A1* | 3/2016 | Wingate | G01S 3/807 704/233 |
| 2016/0073198 | A1* | 3/2016 | Vilermo | H04R 3/005 381/26 |
| 2016/0247518 | A1* | 8/2016 | Schuller | G10L 21/0216 |

OTHER PUBLICATIONS

"Beamforming," http://www.labbookpages.co.uk/audio/beamforming/delaySum.html, accessed: Apr. 21, 2019. 7 pages.
"Comparison of blind source separation techniques," https://github.com/TUIlmenauAMS/Comparison-of-Blind-Source-Separation-techniques, accessed: Jul. 29, 2019. 1 page.
"Differential evolution," http://www1.icsi.berkeley.edu/~storn/code.html, accessed: Apr. 21, 2019. 1 page.
"Ilrma," https://github.com/d-kitamura/ILRMA, accessed: Jul. 29, 2019. 1 page.
"Microphone array speech processing," https://github.com/ZitengWang/MASP, accessed: Jul. 29, 2019. 1 page.
Allen et al. "Image method for efficiently simulating small room acoustics" J. Acoust. Soc. Amer., 1979, vol. 65. 8 pages.
Benesty et al. "Speech enhancement in the STFT domain," Jun. 30, 2011. 120 pages.
Buchner et al. "Trinicon: A versatile framework for multichannel blind signal processing," in IEEE International Conference on Acoustics, Speech, and Signal Processing, Montreal, Que., Canada, 2004. XP010718333 . 4 pages.
Chua et al. "Convolutive blind source separation with low latency," in Acoustic Signal Enhancement (IWAENC), IEEE International Workshop, 2016, pp. 1-5. 5 pages.
Erik G. Learned-Miller, "Entropy and Mutual Information". Department of Computer Science University of Massachusetts, Amherst, Amherst, MA 01003, 2013.4 pages.
Fevotte et al. "Bss eval toolbox user guide," in Tech. Rep. 1706, IRISA Technical Report 1706, Rennes, France, 2005. 22 pages.
G. Evangelista, S. Marchand, M. D. Plumbley, and E. Vincent, "Sound source separation," in DAFX: Digital Audio Effects, second edition ed. John Wiley and Sons, 2011.6 pages.
Golokolenko et al. "A Fast Stereo Audio Source Separation for Moving Sources" 2019 53RD Asilomar Conference on Signals, Systems, and Computers, IEEE, (Nov. 3, 2019), pp. 1931-1935. 5 pages.
Harris et al. "Realtime independent vector analysis with student's t source prior for convolutive speech mixtures," in IEEE International Conference on Acoustics, Speech, and Signal Processing, ICASSP, Apr. 2015. 6 pages.
Hyvärinen et al. "Independent Component Analysis" Mar. 7, 2001. 503 pages.
J. Garofolo et al., "Timit acoustic-phonetic continuous speech corpus," 1993. 95 pages.
J. P. Thiran, "Recursive digital filters with maximally flat group delay," in IEEE Trans. on Circuit Theory, vol. 18, No. 6, Nov. 1971, pp. 659-664. 6 pages.
J. Tariqullah et al. "A multistage approach to blind separation of convolutive speech mixtures," in Speech Communication, 2011, vol. 53, pp. 524-539. 4 pages.
Jansky et al. "A computationally cheaper method for blind speech separation based on auxiva and incomplete demixing transform," in IEEE International Workshop on Acoustic Signal Enhancement (IWAENC), Xi'an, China, 2016. 5 pages.
Khanagha et al., "Selective tap training of FIR filters for Blind Source Separation of convolutive speech mixtures" 2009 IEEE Symposium on Industrial Electronics and Applications, Kuala Lumpar, Malaysia; Oct. 4-6, 2009. 5 pages.
Kitamura et al. "Determined blind source separation unifying independent vector analysis and nonnegative matrix factorization," in IEEE/ACM Trans. ASLP, vol. 24, No. 9, 2016, pp. 1626-1641.16 pages.
Kleijn et al. "Non-iterative impulse response shortening method for system latency reduction," in Acoustics, Speech and Signal Processing (ICASSP), 2017, pp. 581-585. 5 pages.
Laakso et al. "Splitting the unit delay," in IEEE Signal Processing Magazine, Jan. 1996. 31 pages.
S. Das and P. N. Suganthan, "Differential evolution: A survey of the state-of-the-art," in IEEE Trans. on Evolutionary Computation, Feb. 2011, vol. 15, No. 1, pp. 4-31. 42 pages.
Sawada et al. "Blind Audio Source Separation on Tensor Representation," in ICASSP, Apr. 16, 2018, Calgary, Canada, 168 pages.
Senesnick et al. "Low-pass filters realizable as all-pass sums: design via a new flat delay filter," in IEEE Transactions on Circuits and Systems II: Analog and Digital Signal Processing, vol. 46, 1999. 11 pages.
Storn et al. "Differential evolution—a simple and efficient heuristic for global optimization over continuous spaces," in Journal of Global Optimization. 11 (4), 1997, pp. 341-359. 19 pages.
Wu et al. "Simultaneous Diagonalization in the Frequency Domain (SDIF) for Source Separation," in Proc. ICA, 1999, pp. 245-250. 6 pages.

\* cited by examiner

APPARATUS AND METHOD FOR ACQUIRING A PLURALITY OF AUDIO SIGNALS ASSOCIATED WITH DIFFERENT SOUND SOURCES

CROSS-REFERENCE TO RELATED APPLICATIONS

This application is a continuation of copending International Application No. PCT/EP2020/077716, filed Oct. 2, 2020, which is incorporated herein by reference in its entirety, and additionally claims priority from European Application No. 19201575.8, filed Oct. 4, 2019, which is also incorporated herein by reference in its entirety.

The present examples refer to methods and apparatus for obtaining a plurality of output signals associated with different sources (e.g. audio sources). The present examples also refer to methods and apparatus for signal separation. The present examples also refer to methods and apparatus for teleconferencing. Techniques for separation (e.g., audio source separation) are also disclosed. Techniques for fast time domain stereo audio source separation (e.g. using fractional delay filters) are also discussed.

BACKGROUND OF THE INVENTION

FIG. 1 shows the setup of microphones indicated with 50a. The microphones 50a may include a first microphone $mic_0$ and a second microphone mica which are here shown at a distance of 5 cm (50 mm) from each other. Other distances are possible. Two different sources ($source_0$ and $source_1$) are here shown. As identified by angles $\beta_0$ and $\beta_1$, they are placed in different positions (here also in different orientations with respect to each other).

A plurality of input signals $M_0$ and $M_1$ (from the microphones, also collectively indicated as a multi-channel, or stereo, input signal 502), are obtained from the sound $source_0$ and $source_1$. While $source_0$ generates the audio sound indexed as $S_0$, $source_1$ generates the audio sound indexed as $S_1$.

The microphone signals $M_0$ and $M_1$ may be considered, for example, as input signals. It is possible to consider a multi-channel with more than 2 channels instead of stereo signal 502.

The input signals may be more than two in some examples (e.g. other additional input channels besides $M_0$ and $M_1$), even though here only two channels are mainly discussed. Notwithstanding, the present examples are valid for any multi-channel input signal. In examples, it is also not necessary that the signals $M_0$ and $M_1$ are directly obtained by a microphone, since they may be obtained, for example, from a stored audio file.

FIGS. 2a and 4 show the interactions between the sources $source_0$ and $source_1$ and the microphones $mic_0$ and $mic_1$. For example, the $source_0$ generates an audio sound $S_0$, which primarily reaches the microphone $mic_0$ and also reaches the microphone $mic_1$. The same applies to $source_1$, whose generated audio source $S_1$ primarily reaches the microphone $mic_1$ and also reaches the microphone $mic_0$. We see from FIGS. 2a and 4 that the sound $S_0$ needs less time to reach at the microphone $mic_0$, than the time needed for reaching microphone $mic_1$. Analogously, the sound $S_1$ needs less time to arrive at $mic_1$, than the time it takes to arrive at $mic_0$. The intensity of the signal $S_0$, when reaching the microphone $mic_1$, is in general attenuated with respect to when reaching $mic_0$, and vice versa.

Accordingly, in the multi-channel input signal 502, the channel signals $M_0$ and $M_1$ are such that the signals $S_0$ and $S_1$ from the sound $source_0$ and $source_1$ are combinations of each other. Separation techniques are therefore pursued.

SUMMARY

An embodiment may have an apparatus for obtaining a plurality of output signals, associated with different sound sources, on the basis of a plurality of input signals, in which signals from the sound sources are combined, wherein the apparatus is configured to combine a first input signal, or a processed version thereof, with a delayed and scaled version of a second input signal, to obtain a first output signal; wherein the apparatus is configured to combine a second input signal, or a processed version thereof, with a delayed and scaled version of the first input signal, to obtain a second output signal; wherein the apparatus is configured to determine, using a random direction optimization: a first scaling value, which is used to obtain the delayed and scaled version of the first input signal; a first delay value, which is used to obtain the delayed and scaled version of the first input signal; a second scaling value, which is used to obtain the delayed and scaled version of the second input signal; and a second delay value, which is used to obtain the delayed and scaled version of the second input signal, wherein the random direction optimization is such that candidate parameters form a candidates' vector, the candidates' vector being iteratively refined by modifying the candidates' vector in random directions, wherein the random direction optimization is such that a metrics indicating the similarity, or dissimilarity, between the first and second output signals is measured, and the first and second output signals are selected to be those measurements associated with the candidate parameters associated with metrics indicating lowest similarity, or highest dissimilarity, wherein the metrics is processed as a Kullback-Leibler divergence.

According to another embodiment, a method for obtaining a plurality of output signals associated with different sound sources on the basis of a plurality of input signals, in which signals from the sound sources are combined, may have the steps of: combining a first input signal, or a processed version thereof, with a delayed and scaled version of a second input signal, to obtain a first output signal; combining a second input signal, or a processed version thereof, with a delayed and scaled version of the first input signal, to obtain a second output signal; determining, using a random direction optimization, at least one of: a first scaling value, which is used to obtain the delayed and scaled version of the first input signal; a first delay value, which is used to obtain the delayed and scaled version of the first input signal; a second scaling value, which is used to obtain the delayed and scaled version of the second input signal; and a second delay value, which is used to obtain the delayed and scaled version of the second input signal, wherein the random direction optimization is such that candidate parameters form a candidates' vector, the candidates' vector begin iteratively refined by modifying the candidates' vector in random directions, wherein the random direction optimization is such that a metrics indicating the similarity, or dissimilarity, between the first and second output signals is measured, and the first and second output signals are selected to be those measurements associated with the candidate parameters associated with the metrics indicating lowest similarity, or highest dissimilarity, wherein the metrics is processed as a Kullback-Leibler divergence.

Another embodiment may have a non-transitory digital storage medium having a computer program stored thereon to perform the inventive method for obtaining a plurality of output signals associated with different sound sources on the basis of a plurality of input signals, in which signals from the sound sources are combined, when said computer program is run by a computer.

Here below, text in square brackets and round brackets indicates non-limiting examples.

In accordance to an aspect, there is provided an apparatus [e.g. a multichannel or stereo audio source separation apparatus] for obtaining a plurality of output signals [$S'_0$, $S'_1$] associated with different sound sources [$source_0$, $source_1$] on the basis of a plurality of input signals [e.g. microphone signals], in which signals from the sound sources [$source_0$, $source_1$] are combined, wherein the apparatus is configured to combine a first input signal [$M_0$], or a processed [e.g. delayed and/or scaled] version thereof, with a delayed and scaled version [$a_1 \cdot z^{-d1} \cdot M_1$] of a second input signal [e.g. $M_1$] [e.g. by subtracting the delayed and scaled version of the second input signal from the first input signal, e.g. by $S'_0 = M_0(z) - a_1 \cdot z^{-d1} \cdot M_1(z)$], to obtain a first output signal [$S'_0$];

wherein the apparatus is configured to combine a second input signal [$M_1$], or a processed [e.g. delayed and/or scaled] version thereof, with a delayed and scaled version [$a_0 \cdot z^{-d0 \cdot M}_0$] of the first input signal [$M_0$] [e.g. by subtracting the delayed and scaled version of the first input signal from the second input signal, e.g. by $S'_1 = M_1(z) - a_0 \cdot z^{-d0} \cdot M_0(z)$], to obtain a second output signal [$S'_1$];

wherein the apparatus is configured to determine, using a random direction optimization [e.g. by performing one of operations defined in other claims, for example; and/or by finding the delay and attenuation values which minimize an objective function, which could be, for example that in formulas (6) and/or (8)]:

a first scaling value [$a_0$], which is used to obtain the delayed and scaled version [$a_0 \cdot z^{-d0 \cdot M}_0$] of the first input signal [$M_0$];

a first delay value [do], which is used to obtain the delayed and scaled version [$a_0 \cdot z^{-d0 \cdot M}_0$] of the first input signal [$M_0$];

a second scaling value [$a_1$], which is used to obtain the delayed and scaled version [$a_1 \cdot z^{-d1} \cdot M_1$] of the second input signal [$M_1$]; and a second delay value [$d_1$], which is used to obtain the delayed and scaled version of the second input signal [$a_1 \cdot z^{-d1} \cdot M_1$].

The delayed and scaled version [$a_1 \cdot z^{-d1} \cdot M_1$] of the second input signal [$M_1$], may be combined with the first input signal [$M_0$], is obtained by applying a fractional delay to the second input signal [$M_1$].

The delayed and scaled version [$a_0 \cdot z^{-d0 \cdot M}_0$] of the first input signal [$M_0$], may be combined with the second input signal [$M_1$], is obtained by applying a fractional delay to the first input signal [$M_0$].

The apparatus may sum a plurality of products [e.g., as in formula (6) or (8)] between:

a respective element [$P_i(n)$, with i being 0 or 1] of a first set of normalized magnitude values [e.g., as in formula (7)], and a logarithm of a quotient formed on the basis of:
the respective element [$P(n)$ or $P_1(n)$] of the first set of normalized magnitude values; and
a respective element [$Q(n)$ or $Q_1(n)$] of a second set of normalized magnitude values, in order to obtain a value [DKL(P∥Q) or D(P0,P1) in formulas (6) or (8)] describing a similarity [or dissimilarity] between a signal portion [$s_0'(n)$] described by the first set of normalized magnitude values [$P_0(n)$, for n=1 to . . . ] and a signal portion [$s_1'(n)$] described by the second set of normalized magnitude values [$P_1(n)$, for n=1 to . . . ].

The random direction optimization may be such that candidate parameters form a candidates' vector [e.g., with four entries, e.g. corresponding to $a_0$, $a_1$, $d_0$, $d_1$], wherein the vector is iteratively refined [e.g., in different iterations, see also claims 507ff.] by modifying the vector in random directions.

The random direction optimization may be such that candidate parameters form a candidates' vector [e.g., with four entries, e.g. corresponding to $a_0$, $a_1$, $d_0$, $d_1$], wherein the vector is iteratively refined [e.g., in different iterations, see also below] by modifying the vector in random directions.

The random direction optimization may be such that a metrics and/or a value indicating the similarity (or dissimilarity) between the first and second output signals is measured, and the first and second output measurements are selected to be those measurements associated to the candidate parameters associated to the value or metrics indicating lowest similarity (or highest dissimilarity).

At least one of the first and second scaling values and first and second delay values may be obtained by minimizing the mutual information or related measure of the output signals.

In accordance to an aspect, there is provided an apparatus for obtaining a plurality of output signals [$S'_0$, $S'_1$] associated with different sound sources [$source_1$, $source_2$] on the basis of a plurality of input signals [e.g. microphone signals] [$M_0$, $M_1$], in which signals from the sound sources [$source_1$, $source_2$] are combined, wherein the apparatus is configured to combine a first input signal [$M_0$], or a processed [e.g. delayed and/or scaled] version thereof, with a delayed and scaled version [$a_1 \cdot z^{-d1} \cdot M_1$] of a second input signal [$M_1$], to obtain a first output signal [$S'_0$], wherein the apparatus is configured to apply a fractional delay [$d_1$] to the second input signal [$M_1$] [wherein the fractional delay ($d_1$) may be indicative of the relationship and/or difference between the delay (e.g. delay represented by $H_{1,0}$) of the signal ($H_{1,0} \cdot S_1$) arriving at the first microphone ($mic_0$) from the second source ($source_1$) and the delay (e.g. delay represented by $H_{1,1}$) of the signal ($H_{1,1} \cdot S_1$) arriving at the second microphone ($mic_1$) from the second ($source_1$)][in examples, the fractional delay $d_1$ may be understood as approximating the exponent of the z term of the result of the fraction $H_{1,0}(z)/H_{1,1}(z)$];

wherein the apparatus is configured to combine a second input signal [$M_1$], or a processed [e.g. delayed and/or scaled] version thereof, with a delayed and scaled version [$a_0 \cdot z^{-d0} \cdot M_0$] of the first input signal [$M_0$], to obtain a second output signal [$S'_1$], wherein the apparatus is configured to apply a fractional delay [$d_0$] to the first input signal [$M_0$] [wherein the fractional delay ($d_0$) may be indicative of the relationship and/or difference between the delay (e.g. delay represented by $H_{0,0}$) of the signal ($H_{0,0} \cdot S_0$) arriving at the first microphone ($mic_0$) from the first source ($source_0$) and the delay (e.g. delay represented by $H_{0,1}$) of the signal ($H_{0,1} \cdot S_0$) arriving at the second microphone ($mic_1$) from the first source ($source_0$)][in examples, the fractional delay $d_0$ may be understood as approximating the exponent of the z term of the result of the fraction $H_{0,1}(z)/H_{0,0}(z)$];

wherein the apparatus is configured to determine, using an optimization:
a first scaling value [$a_0$], which is used to obtain the delayed and scaled version [$a_0 \cdot z^{-d0} \cdot M_0$] of the first input signal [$M_0$];
a first fractional delay value [$d_0$], which is used to obtain the delayed and scaled version [$a_0 \cdot z^{-d0} \cdot M_0$] of the first input signal [$M_0$];
a second scaling value [$a_1$], which is used to obtain the delayed and scaled version [$a_1 \cdot z^{-d1} \cdot M_1$] of the second input signal [$M_1$]; and
a second fractional delay value [$d_1$], which is used to obtain the delayed and scaled version [$a_1 \cdot z^{-d1} \cdot M_1$] of the second input signal [$M_1$].

The optimization may be a random direction optimization.

The apparatus may sum a plurality of products [e.g., as in formula (6) or (8)] between:
a respective element [$P_i(n)$, with i being 0 or 1] of a first set of normalized magnitude values [e.g., as in formula (7)], and
a logarithm of a quotient formed on the basis of:
the respective element [$P(n)$ or $P_i(n)$] of the first set of normalized magnitude values; and
a respective element [$Q(n)$ or $Q_i(n)$] of a second set of normalized magnitude values,
in order to obtain a value [DKL(P||Q) or D(P0,P1) in formulas (6) or (8)] describing a similarity [or dissimilarity] between a signal portion [$s_0'(n)$] described by the first set of normalized magnitude values [$P_0(n)$, for n=1 to . . . ] and a signal portion [$s_1'(n)$] described by the second set of normalized magnitude values [$P_1(n)$, for n=1 to . . . ].

In accordance to an aspect, there is provided an apparatus [e.g. a multichannel or stereo audio source separation apparatus] for obtaining a plurality of output signals [$S'_0$, $S'_1$] associated with different sound sources [$source_0$, $source_1$] on the basis of a plurality of input signals [e.g. microphone signals][$M_0$, $M_1$], in which signals from the sound sources are combined [e.g. by subtracting a delayed and scaled version of a second input signal from a first input signal and/or by subtracting a delayed and scaled version of a first input signal from a second input signal],
wherein the apparatus is configured to combine a first input signal [$M_0$], or a processed [e.g. delayed and/or scaled] version thereof, with a delayed and scaled version [$a_1 \cdot z^{-d1} \cdot M_1$] of a second input signal [$M_1$] [e.g. by subtracting the delayed and scaled version of the second input signal from the first input signal], to obtain a first output signal [$S'_0$],
wherein the apparatus is configured to combine a second input signal [$M_1$], or a processed [e.g. delayed and/or scaled] version thereof, with a delayed and scaled version [$a_0 \cdot z^{-d0} \cdot M_0$] of the first input signal [$M_0$] [e.g. by subtracting the delayed and scaled version of the first input signal from the second input signal], to obtain a second output signal [$S'_1$],
wherein the apparatus is configured to sum a plurality of products [e.g., as in formula (6) or (8)] between:
a respective element [$P_i(n)$, with i being 0 or 1] of a first set of normalized magnitude values [e.g., as in formula (7)], and
a logarithm of a quotient formed on the basis of:
the respective element [$P(n)$ or $P_i(n)$] of the first set of normalized magnitude values; and
a respective element [$Q(n)$ or $Q_i(n)$] of a second set of normalized magnitude values,
in order to obtain a value [DKL(P||Q) or D(P0,P1) in formulas (6) or (8)] describing a similarity [or dissimilarity] between a signal portion [$s_0'(n)$] described by the first set of normalized magnitude values [$P_0(n)$, for n=1 to . . . ] and a signal portion [$s_1'(n)$] described by the second set of normalized magnitude values [$P_1(n)$, for n=1 to . . . ].

The apparatus may determine:
a first scaling value [$a_1$], which is used to obtain the delayed and scaled version of the first input signal [$M_0$],
a first delay value [$d_0$], which is used to obtain the delayed and scaled version of the first input signal,
a second scaling value [$a_1$], which is used to obtain the delayed and scaled version of the second input signal, and
a second delay value [$d_1$], which is used to obtain the delayed and scaled version of the second input signal,
using an optimization [e.g. on the basis of a "modified KLD computation"]

The first delay value [$d_0$] may be a fractional delay. The second delay value [$d_1$] is a fractional delay.

The optimization may be a random direction optimization.

The apparatus may perform at least some of the processes in the time domain. The apparatus may perform at least some of the processes in the z transform or frequency domain.

The apparatus may be configured to:
combine the first input signal [$M_0$], or a processed [e.g. delayed and/or scaled] version thereof, with the delayed and scaled version [$a_1 \cdot z^{-d1} \cdot M_1$] of the second input signal [$M_1$] in the time domain and/or in the z transform or frequency domain;
combine the second input signal [$M_1$], or a processed [e.g. delayed and/or scaled] version thereof, with the delayed and scaled version [$a_0 \cdot z^{-d0 \cdot M}{}_0$] of the first input signal [$M_0$] in the time domain and/or in the z transform or frequency domain.

The optimization may be performed in the time domain and/or in the z transform or frequency domain.

The fractional delay ($d_0$) applied to the second input signal [$M_1$] may be indicative of the relationship and/or difference or arrival between:
the signal [$S_0 \cdot H_{0,0}(z)$] from the first source [$source_0$] received by the first microphone [$mic_0$]; and
the signal [$S_0 \cdot H_{0,1}(z)$] from the first source [$source_0$] received by the second microphone [$mic_1$].

The fractional delay ($d_1$) applied to the first input signal [$M_0$] may be indicative of the relationship and/or difference or arrival between:
the signal [$S_1 \cdot H_{1,1}(z)$] from the second source [$source_1$] received by the second microphone [$mic_1$]; and
the signal [$S_1 \cdot H_{1,0}(z)$] from the second source [$source_1$] received by the first microphone [$mic_0$].

The apparatus may perform an optimization [e.g., the optimization such that different candidate parameters [$a_0$, $a_1$, $d_0$, $d_1$] are iteratively chosen and processed, and a metrics [e.g., as in formula (6) or (8)] [e.g. on the basis of a "modified KLD computation"][e.g., objective function] is measured for each of the candidate parameters, wherein the metrics is a similarity metrics (or dissimilarity metrics), so as to choose the first input signal [$M_0$] and the second input signal [$M_0$]) obtained by using the candidate parameters [$a_0$, $a_1$, $d_0$, $d_1$] which associated to the metrics indicating the lowest similarity (or largest dissimilarity). [the similarity may be imagined as a statistic dependency between the first and second input signals (or values associated thereto, such as those in formula (7)], and/or the dissimilarity may be imagined as a statistic independency between the first and second input signals (or values associated thereto, such as those in formula (7)]

For each iteration, the candidate parameters may include a candidate delay ($d_0$) [e.g., a candidate fractional delay] to be applied to the second input signal [$M_1$], the candidate delay ($d_0$) being associable to a candidate relationship and/or candidate difference or arrival between:
  the signal [$S_0 \cdot H_{0,0}(z)$] from the first source [source$_0$] received by the first microphone [mic$_0$]; and
  the signal [$S_0 \cdot H_{0,1}(z)$] from the first source [source$_0$] received by the second microphone [mic$_0$].

For each iteration, the candidate parameters include a candidate delay ($d_1$) [e.g., a candidate fractional delay] to be applied to the first input signal [$M_0$], the candidate delay ($d_1$) being associable to a candidate relationship and/or candidate difference or arrival between:
  the signal [$S_1 \cdot H_{1,1}(z)$] from the second source [source$_1$] received by the second microphone [mic$_1$]; and
  the signal [$S_1 \cdot H_{1,0}(z)$] from the second source [source$_1$] received by the first microphone [mic$_0$].

For each iteration, the candidate parameters may include a candidate relative attenuation value [$a_0$] to be applied to the second input signal [$M_1$], the candidate relative attenuation value [$a_0$] being indicative of a candidate relationship and/or candidate difference between:
  the amplitude of the signal [$S_0 \cdot H_{0,0}(z)$] received by the first microphone [mic$_0$] from the first source [source$_0$]; and
  the amplitude of the signal [$S_0 \cdot H_{0,1}(z)$] received by the second microphone [mic$_1$] from the first source [source$_0$].

For each iteration, the candidate parameters may include a candidate relative attenuation value [$a_1$] to be applied to the first input signal [$M_0$], the candidate relative attenuation value [$a_1$] being indicative of a candidate relationship and/or candidate difference between:
  the amplitude of the signal [$S_1 \cdot H_{1,1}(z)$] received by the second microphone [mic$_1$] from the second source [source$_1$]; and
  the amplitude of the signal [$S_1 \cdot H_{1,0}(z)$] received by the first microphone [mic$_0$] from the second source [source$_1$].

The apparatus may change at least one candidate parameter for different iterations by randomly choosing at least one step from at least one candidate parameter for a preceding iteration to at least one candidate parameter for a subsequent iteration [e.g., random direction optimization].

The apparatus may choose the at least one step [e.g., coeffvariation in line 10 of algorithm 1] randomly [e.g., random direction optimization].

The at least one step may be weighted by a preselected weight [e.g. coeffweights in line 5 of algorithm 1].

The at least one step is limited by a preselected weight [e.g. coeffweights in line 5 of algorithm 1].

The apparatus may be so that the candidate parameters [$a_0$, $a_1$, $d_0$, $d_1$] form a candidates' vector, wherein, for each iteration, the candidates' vector is perturbed [e.g., randomly] by applying a vector of uniformly distributed random numbers [e.g., each between −0.5 and +0.5], which are element-wise multiplied by (or added to) the elements of the candidates' vector. [it is possible to avoid gradient processing] [e.g., random direction optimization].

For each iteration, the candidates' vector is modified (e.g., perturbed) for a step [e.g., which is each between −0.5 and +0.5].

The apparatus may be so that the numeric of iterations is limited to a predetermined maximum number, the predetermined maximum number being between 10 and 30 (e.g., 20, as in subsection 2.3, last three lines).

The metrics may be processed as a Kullback-Leibler divergence.

The metrics may be based on:
  for each of the first and second signals [$M_0$, $M_1$], a respective element [$P_i(n)$, with i being 0 or 1] of a first set of normalized magnitude values [e.g., as in formula (7)]. [a trick may be: considering the normalized magnitude values of the time domain samples as probability distributions, and after that measuring the metrics (e.g., as the Kullback-Leibler divergence, e.g. as obtained though formula (6) or (8))]

For at least one of the first and second input signals [$M_0$, $M_1$], the respective element [$P_i(n)$] may be based on the candidate first or second outputs signal [$S'_0$, $S'_1$] as obtained from the candidate parameters [e.g., like in formula (7)].

For at least one of the first and second input signals [$M_0$, $M_1$], the respective element [$P_i(n)$] may be based on the candidate first or second outputs signal [$S'_0$, $S'_1$] as obtained from the candidate parameters [e.g., like in formula (7)].

For at least one of the first and second input signals [$M_0$, $M_1$], the respective element [$P_i(n)$] may be obtained as a fraction between:
  a value [e.g., absolute value] associated to a candidate first or second output signal [$S'_0(n)$, $S'_1(n)$] [e.g., in absolute value]; and
  a norm [e.g., 1-norm] associated to the previously obtained values of the first or second output signal [$S'_0(\ldots n-1)$, $S'_1(\ldots n-1)$].

For at least one of the first and second input signals [$M_0$, $M_1$], the respective element [$P_i(n)$] may be obtained by $$P_i(n) = \frac{|s'_i(n)|}{\|\|s'_i\|\|1} \qquad (7)$$

(Here, "$s'_i(n)$" and "$s'_i$" are written without capital letters by virtue of not being, in this case, z transforms).

The metrics may include a logarithm of a quotient formed on the basis of:
  the respective element [$P(n)$ or $P_i(n)$] of the first set of normalized magnitude values; and
  a respective element [$Q(n)$ or $Q_1(n)$] of a second set of normalized magnitude values,
  in order to obtain a value [$D_{KL}(P\|Q)$ or $D(P0,P1)$ in formulas (6) or (8)] describing a similarity [or dissimilarity] between a signal portion [$s_0'(n)$] described by the first set of normalized magnitude values [$P_0(n)$, for n=1 to ...] and a signal portion [$s_1'(n)$] described by the second set of normalized magnitude values [$P_i(n)$, for n=1 to ...].

The metrics may be obtained in form of:

$$D_{KL}(P\|Q) = \sum_n P(n) \log\left(\frac{P(n)}{Q(n)}\right) \qquad (6)$$

wherein $P(n)$ is an element associated to the first input signal [e.g., $P_1(n)$ or element of the first set of normalized magnitude values] and $Q(n)$ is an element associated to the second input signal [e.g., $P_2(n)$ or element of the second set of normalized magnitude values].

The metrics may be obtained in form of:

$$D(P_0, P_1) = -\sum_n \left[P_0(n)\log\left(\frac{P_0(n)}{P_1(n)}\right) + P_1(n)\log\left(\frac{P_1(n)}{P_0(n)}\right)\right] \quad (8)$$

wherein $P_1(n)$ is an element associated to the first input signal [e.g., $P_1(n)$ or element of the first set of normalized magnitude values] and $P_2(n)$ is an element associated to the second input signal [e.g., element of the second set of normalized magnitude values].

The apparatus may perform the optimization using a sliding window [e.g., the optimization may take into account TD samples of the last 0.1 s ... 1.0 s].

The apparatus may transform, into a frequency domain, information associated to the obtained first and second output signals ($S'_0$, $S'_1$).

The apparatus may encode information associated to the obtained first and second output signals ($S'_0$, $S'_1$).

The apparatus may store information associated to the obtained first and second output signals ($S'_0$, $S'_1$).

The apparatus may transmit information associated to the obtained first and second output signals ($S'_0$, $S'_1$).

The apparatus of any of the preceding claims may include at least one of a first microphone ($mic_0$) for obtaining the first input signal [$M_0$] and a second microphone ($mic_1$) for obtaining the second input signal [$M_1$]. [e.g., at a fixed distance]

An apparatus for teleconferencing may be provided, including the apparatus as above and equipment for transmitting information associated to the obtained first and second output signals ($S'_0$, $S'_1$).

A binaural system is disclosed including the apparatus as above.

An optimizer is disclosed for iteratively optimizing physical parameters associated to physical signals, wherein the optimizer is configured, at each iteration, to randomly generate a current candidate vector for evaluating whether the current candidate vector performs better than a current best candidate vector,
    wherein the optimizer is configured to evaluate an objective function associated to a similarity, or dissimilarity, between physical signals, in association to the current candidate vector,
    wherein the optimizer is configured so that, in case the current candidate vector causes the objective function to be reduced with respect to the current best candidate vector, to render, as the new current best candidate vector, the current candidate vector.

The physical signal may include audio signals obtained by different microphones.

The parameters may include a delay and/or a scaling factor for an audio signal obtained at a particular microphone.

The objective function is a Kullback-Leibler divergence. The Kullback-Leibler divergence may be applied to a first and a second sets of normalized magnitude values.

The objective function may be obtained by summing a plurality of products [e.g., as in formula (6) or (8)] between:
    a respective element [$P_i(n)$, with i being 0 or 1] of a first set of normalized magnitude values [e.g., as in formula (7)], and
    a logarithm of a quotient formed on the basis of:
        the respective element [P(n) or $P_1(n)$] of the first set of normalized magnitude values; and
        a respective element [Q(n) or $Q_1(n)$] of a second set of normalized magnitude values,
    in order to obtain a value [DKL(P∥Q) or D(P0,P1) in formulas (6) or (8)] describing a similarity [or dissimilarity] between a signal portion [$s_0'(n)$] described by the first set of normalized magnitude values [$P_0(n)$, for n=1 to ... ] and a signal portion [$s_1'(n)$] described by the second set of normalized magnitude values [$P_1(n)$, for n=1 to ... ].

The objective function may be obtained as $$D(P_0, P_1) = -\sum_n \left[P_0(n)\log\left(\frac{P_0(n)}{P_1(n)}\right) + P_1(n)\log\left(\frac{P_1(n)}{P_0(n)}\right)\right] \quad (8)$$

$$D_{KL}(P\|Q) = \sum_n P(n)\log\left(\frac{P(n)}{Q(n)}\right) \quad (6)$$

wherein $P_i(n)$ or $P(n)$ is an element associated to the first input signal [e.g., $P_1(n)$ or element of the first set of normalized magnitude values] and $P_2(n)$ or $Q(n)$ is an element associated to the second input signal.

In accordance to an example, there is provided a method for obtaining a plurality of output signals [$S'_0$, $S'_1$] associated with different sound sources [$source_0$, $source_1$] on the basis of a plurality of input signals [e.g. microphone signals] [$M_0$, $M_1$], in which signals from the sound sources [$source_0$, $source_1$] are combined,
    the method comprising:
        combining a first input signal [$M_0$], or a processed [e.g. delayed and/or scaled] version thereof, with a delayed and scaled version [$a_1 \cdot z^{-d1} \cdot M_1$] of a second input signal [$M_1$] [e.g. by subtracting the delayed and scaled version of the second input signal from the first input signal, e.g. by $S'_0 = M_0(z) - a_1 \cdot z^{-d1} \cdot M_1(z)$], to obtain a first output signal [$S'_0$];
        combining a second input signal [$M_1$], or a processed [e.g. delayed and/or scaled] version thereof, with a delayed and scaled version [$a_0 \cdot z^{-d0} \cdot M_0$] of the first input signal [$M_0$] [e.g. by subtracting the delayed and scaled version of the first input signal from the second input signal, e.g. by $S'_1 = M_1(z) - a_0 \cdot z^{-d0} \cdot M_0(z)$], to obtain a second output signal [$S'_1$];
        determining, using a random direction optimization [e.g. by performing one of operations defined in other claims, for example; and/or by finding the delay and attenuation values which minimize an objective function, which could be, for example that in formulas (6) and/or (8)]:
            a first scaling value [$a_0$], which is used to obtain the delayed and scaled version [$a_0 * z^{-d0} * M_0$] of the first input signal [$M_0$];
            a first delay value [$d_0$], which is used to obtain the delayed and scaled version [$a_0 * z^{-d0} * M_0$] of the first input signal [$M_0$];
            a second scaling value [$a_1$], which is used to obtain the delayed and scaled version [$a_1 * z^{-d1} * M_1$] of the second input signal [$M_1$]; and
            a second delay value [$d_1$], which is used to obtain the delayed and scaled version of the second input signal [$a_1 * z^{-d1} * M_1$].

In accordance to an example, there is provided a method method for obtaining a plurality of output signals [$S'_0$, $S'_1$] associated with different sound sources [$source_1$, $source_2$] on the basis of a plurality of input signals [e.g. microphone signals][$M_0$, $M_1$], in which signals from the sound sources [$source_1$, $source_2$] are combined, the method including combining a first input signal [$M_0$], or a processed [e.g. delayed and/or scaled] version thereof, with a delayed and scaled version [$a_1*z^{-d1}*M_1$] of a second input signal [$M_1$], to obtain a first output signal [$S'_0$], wherein the method is configured to apply a fractional delay [$d_1$] to the second input signal [$M_1$] [wherein the fractional delay ($d_1$) may be indicative of the relationship and/or difference between the delay (e.g. delay represented by $H_{1,0}$) of the signal ($H_{1,0}*S_1$) arriving at the first microphone ($mic_0$) from the second source ($source_1$) and the delay (e.g. delay represented by $H_{1,1}$) of the signal ($H_{1,1}*S_1$) arriving at the second microphone ($mic_1$) from the second ($source_1$)][in examples, the fractional delay $d_1$ may be understood as approximating the exponent of the z term of the result of the fraction $H_{1,0}(z)/H_{1,1}(z)$];

combining a second input signal [$M_1$], or a processed [e.g. delayed and/or scaled] version thereof, with a delayed and scaled version [$a_0*z^{-d0}*M_0$] of the first input signal [$M_0$], to obtain a second output signal [$S'_1$], wherein the method is configured to apply a fractional delay [$d_0$] to the first input signal [$M_0$] [wherein the fractional delay ($d_0$) may be indicative of the relationship and/or difference between the delay (e.g. delay represented by $H_{0,0}$) of the signal ($H_{0,0}*S_0$) arriving at the first microphone ($mic_0$) from the first source ($source_0$) and the delay (e.g. delay represented by $H_{0,1}$) of the signal ($H_{0,1}*S_0$) arriving at the second microphone (mics) from the first source ($source_0$)][in examples, the fractional delay $d_0$ may be understood as approximating the exponent of the z term of the result of the fraction $H_{0,1}(z)/H_{0,0}(z)$];

determining, using an optimization:

a first scaling value [$a_0$], which is used to obtain the delayed and scaled version [$a_0*z^{-d0}*M_0$] of the first input signal [$M_0$];

a first fractional delay value [$d_0$], which is used to obtain the delayed and scaled version [$a_0*z^{-d0}*M_0$] of the first input signal [$M_0$];

a second scaling value [$a_1$], which is used to obtain the delayed and scaled version [$a_1*z^{-d1}*M_1$] of the second input signal [$M_1$]; and a second fractional delay value [$d_1$], which is used to obtain the delayed and scaled version [$a_1*z^{-d1}*M_1$] of the second input signal [$M_1$].

In accordance to an example, there is provided a method for obtaining a plurality of output signals [$S'_0$, $S'_1$] associated with different sound sources [$source_0$, $source_1$] on the basis of a plurality of input signals [e.g. microphone signals] [$M_0$, $M_1$], in which signals from the sound sources are combined [e.g. by subtracting a delayed and scaled version of a second input signal from a first input signal and/or by subtracting a delayed and scaled version of a first input signal from a second input signal], combining a first input signal [$M_0$], or a processed [e.g. delayed and/or scaled] version thereof, with a delayed and scaled version [$a_1*z^{-d1}*M_1$] of a second input signal [$M_1$] [e.g. by subtracting the delayed and scaled version of the second input signal from the first input signal], to obtain a first output signal [$S'_0$], combining a second input signal [$M_1$], or a processed [e.g. delayed and/or scaled] version thereof, with a delayed and scaled version [$a_0*z^{-d0}*M_0$] of the first input signal [$M_0$] [e.g. by subtracting the delayed and scaled version of the first input signal from the second input signal], to obtain a second output signal [$S'_1$], summing a plurality of products [e.g., as in formula (6) or (8)] between:

a respective element [$P_i(n)$, with i being 0 or 1] of a first set of normalized magnitude values [e.g., as in formula (7)], and a logarithm of a quotient formed on the basis of:

the respective element [$P(n)$ or $P_1(n)$] of the first set of normalized magnitude values; and a respective element [$Q(n)$ or $Q_1(n)$] of a second set of normalized magnitude values, in order to obtain a value [$DKL(P\|Q)$ or $D(P0,P_1)$ in formulas (6) or (8)] describing a similarity [or dissimilarity] between a signal portion [$s_0'(n)$] described by the first set of normalized magnitude values [$P_0(n)$, for n=1 to . . . ] and a signal portion [$s_1'(n)$] described by the second set of normalized magnitude values [$P_1(n)$, for n=1 to . . . ].

In accordance to an example, there is provided a method of any of the preceding method claims, configured to use equipment as above or below.

A non-transitory storage unit storing instructions which, when executed by a processor, cause the processor to perform a method according to any of the preceding method claims.

BRIEF DESCRIPTION OF THE DRAWINGS

Embodiments of the present invention will be detailed subsequently referring to the appended drawings, in which.

DETAILED DESCRIPTION OF THE INVENTION

It has been understood that by applying the techniques such as those discussed above and below, a signal may be processed so as to arrive at a plurality of signals $S_1'$ and $S_0'$ separated with each other. Therefore, the result is that the output signal $S_1'$ is not affected (or negligibly or minimally affected) from the sound $S_0$, while the output signal $S_1'$ is not affected (or minimally or negligibly affected) by the effects of the sound $S_1$ onto the microphone $mic_0$.

Figure 2A:
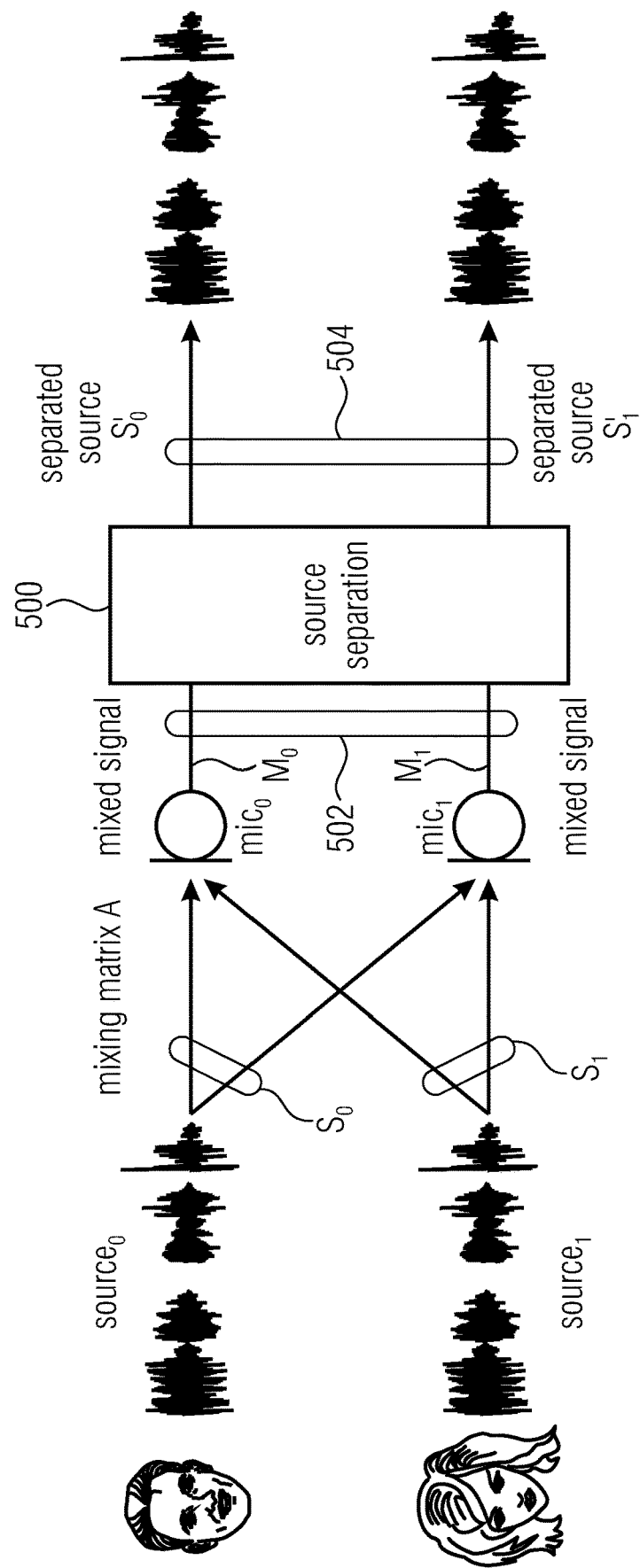
FIG. 2a shows a functioning technique according to the present invention.
Figure 2B:
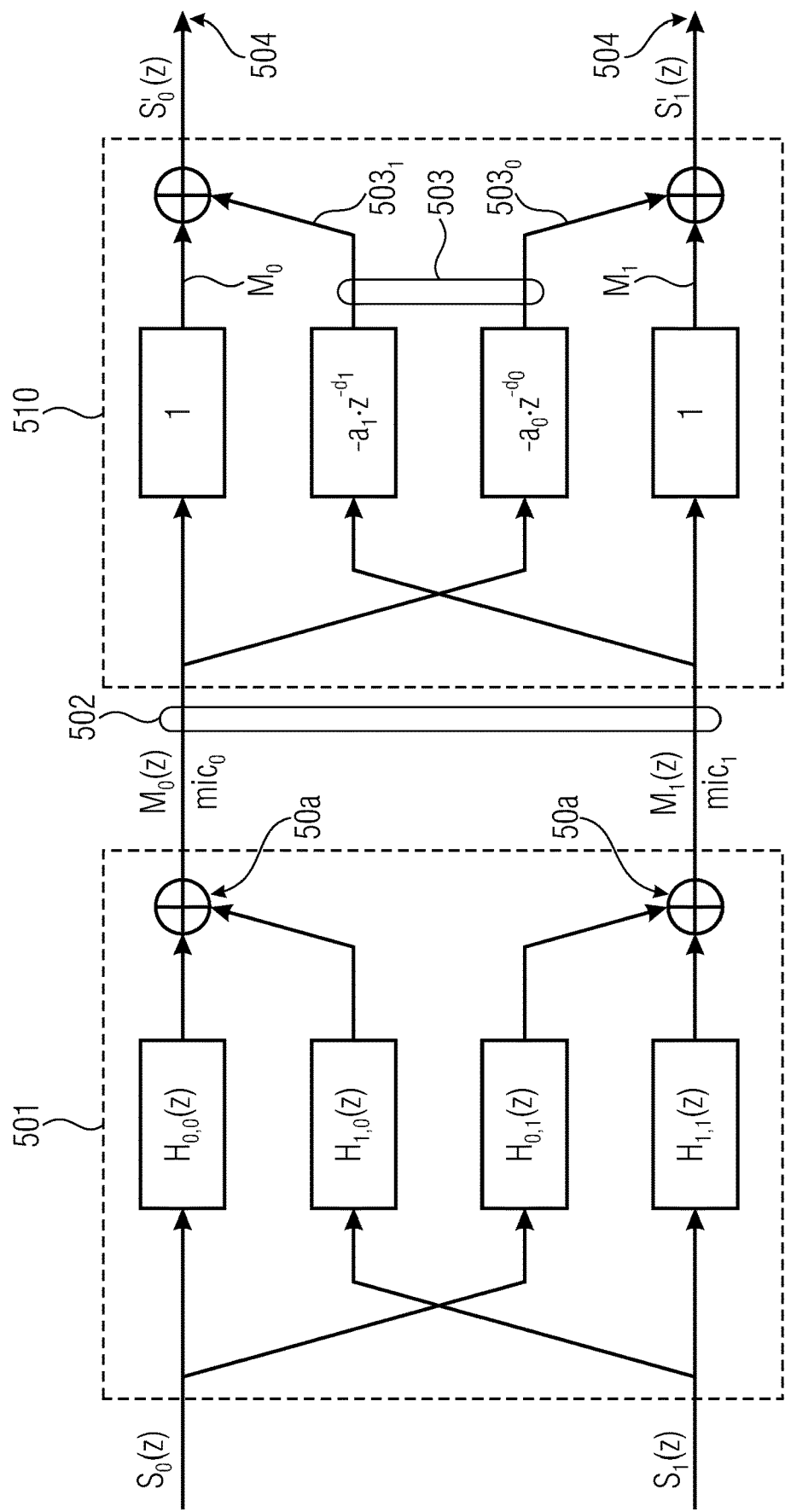
FIG. 2b shows a signal block diagram of convulsive mixing and mixing process.

An example is provided by FIG. 2b, showing a model of the physical relationships between the generated sounds $S_0$ and $S_1$ and the signal 502 as collectively obtained from the microphones $M_0$ and $M_1$. The results are here represented in the z transform (which in some cases is not indicated for the sake of brevity). As can be seen from block 501, the sound signal $S_0$ is subjected to a transfer function $H_{0,0}(z)$ which is summed to the sound signal $S_1$ (modified by a transfer function $H_{1,0}(z)$). Accordingly, the signal $M_0(z)$ is obtained at microphone $mic_0$ and keeps into account, unwantedly, the sound signal $S_1(z)$. Analogously, the signal $M_1(z)$ as obtained at the microphone $mic_1$ includes both a component associated to the sound signal $S_1(z)$ (obtained through a transfer function $H_{1,1}(z)$) and a second, unwanted component caused by the sound signal $S_0(z)$ (after having been subjected to the transfer function $H_{0,1}(z)$). This phenomenon is called crosstalk.

In order to compensate for the crosstalk, the solution indicated at block 510 may be exploited. Here, the multichannel output signal 504 includes:
- a first output signal $S_0'(z)$ (representing the sound $S_0$ collected at microphone $mic_0$ but polished from the crosstalk), which includes at least the two components:
  the input signal $M_0$ and
  a subtractive component 503$_1$ (which is a delayed and/or scaled version of the signal $M_1$ and which may be being obtained by subjecting the signal $M_1$ to the transfer function $-a_1 \cdot z^{-d1}$)
- an output signal $S_1'(z)$ (representing the sound $S_1$ collected at microphone $mic_1$ but polished from the crosstalk) which includes:
  the input signal $M_1$ and
  a subtractive component 503$_0$ (which is a delayed and/or scaled version of the first input signal $M_0$ as obtained at the microphone $mic_0$ and which may be obtained by subjecting the signal $M_0$ to the transfer function $-a_0 \cdot z^{-d0}$).

The mathematical explanations are provided below, but it may be understood that the subtractive components 503$_1$ and 503$_0$ at block 510 compensate for the unwanted components caused at block 501. It is therefore clear that block 510 permits to obtain a plurality (504) of output signals ($S'_0, S'_1$), associated with different sound sources ($source_0, source_1$), on the basis of a plurality (502) of input signals [e.g. microphone signals][($M_0, M_1$), in which signals ($S_0, S_1$) from the sound sources ($source_0, source_1$) are (unwantedly) combined (501). The block 510 may be configured to combine (510) the first input signal ($M_0$), or a processed [e.g. delayed and/or scaled] version thereof, with a delayed and scaled version (503$_1$) [$a_1 \cdot z^{-d1} \cdot M_1$] of the second input signal ($M_1$) [e.g. by subtracting the delayed and scaled version of the second input signal from the first input signal, e.g. by $S'_0(z) = M_0(z) - a_1 \cdot z^{-d1} \cdot M_1(z)$], to obtain a first output signal ($S'_0$); wherein the block is configured to combine (510) a second input signal ($M_1$), or a processed [e.g. delayed and/or scaled] version thereof, with a delayed and scaled version (503$_0$) [$a_0 \cdot z^{-d0} \cdot M_0$] of the first input signal [$M_0$] [e.g. by subtracting the delayed and scaled version of the first input signal from the second input signal, e.g. by $S'_1(z) = M_1(z) - a_0 \cdot z^{-d0} \cdot M_0(z)$], to obtain a second output signal [$S'_1$].

While the z transform is particularly useful in this case, it is notwithstanding possible to make use of other kinds of transforms or to directly operate in the time domain.

Basically, it may be understood that a couple of scaling values $a_0$ and $a_1$ modify the amplitude of the subtractive components 503$_1$ and 503$_0$ to obtain a scaled version of the input signals, and the delays $d_0$ and $d_1$ may be understood as fractional delays. In examples, the fractional delay $d_0$ may be understood as approximating the exponent of the z term of the result of the fraction $H_{0,1}(z)/H_{0,0}(z)$]. The fractional delay $d_1$ may be indicative of the relationship and/or difference between the delay (e.g. delay represented by $H_{1,0}$) of the signal ($H_{1,0} \cdot S_1$) arriving at the first microphone ($mic_0$) from the second source ($source_1$) and the delay (e.g. delay represented by $H_{1,1}$) of the signal ($H_{1,1} \cdot S_1$) arriving at the second microphone ($mic_1$) from the second ($source_1$). In examples, the fractional delay $d_1$ may be understood as approximating the exponent of the z term of the result of the fraction $H_{1,0}(z)/H_{1,1}(z)$]. The fractional delay $d_0$ may be indicative of the relationship and/or difference between the delay (e.g. delay represented by $H_{0,0}$) of the signal ($H_{0,0} \cdot S_0$) arriving at the first microphone ($mic_0$) from the first source ($source_0$) and the delay (e.g. delay represented by $H_{0,1}$) of the signal ($H_{0,1} \cdot S_0$) arriving at the second microphone ($mic_1$) from the first source ($source_0$)][in examples, the fractional delay $d_0$ may be understood as approximating the exponent of the z term of the result of the fraction $H_{0,1}(z)/H_{0,0}(z)$].

As it will be explained subsequently, it is possible to find the most advantageous values (also collectively indicated with the reference numeral 564), in particular:
- a first scaling value [$a_0$], e.g., which is used to obtain the delayed and scaled version 503$_0$ [$a_0 \cdot z^{-d0} \cdot M_0$] of the first input signal [502, $M_0$];
- a first fractional delay value [$d_0$], e.g., which is used to obtain the delayed and scaled version 503$_0$ [$a_0 \cdot z^{-d0} \cdot M_0$] of the first input signal [502, $M_0$];
- a second scaling value [$a_1$], e.g., which is used to obtain the delayed and scaled version 503$_1$ [$a_1 \cdot z^{-d1} \cdot M_1$] of the second input signal [502, $M_1$]; and
- a second fractional delay value [$d_1$], e.g., which is used to obtain the delayed and scaled version 503$_1$ [$a_1 \cdot z^{-d1} \cdot M_1$] of the second input signal [502, $M_1$].

Figure 5:
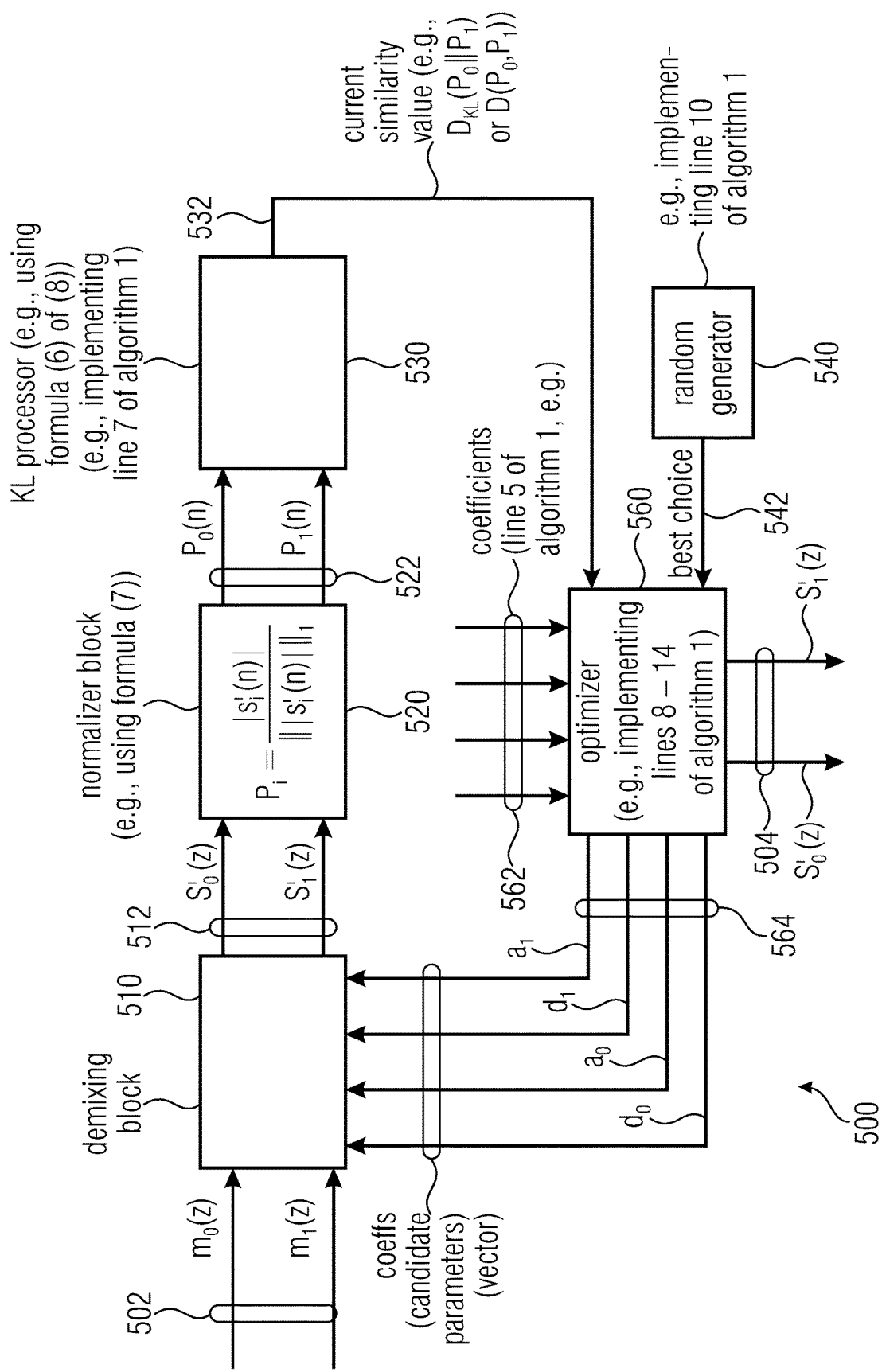
FIG. 5 shows an apparatus according to the invention.

Techniques for obtaining the most advantageous scaling values $a_0$ and $a_1$ and delay values $d_0$ and $d_1$ are here discussed, particularly with reference to FIG. 5. As can be seen from FIG. 5, a stereo or multiple channel signal 502 (including the inputs signals $M_0(z)$ and $M_1(z)$) is obtained. As can be seen, the method may be iterative, in the sense that it is possible to cycle along multiple iterations for obtaining the best values of the scaling values and the delay values to be adopted.

FIG. 5 shows an output 504 formed by signals $S_0'(z)$ and $S_1'(z)$ which are optimized, e.g. after multiple iterations. FIG. 5 shows the mixing block 510, which may be the block 510 of FIG. 2b.

The multichannel signal 510 (including its channel components, i.e. the multiple input signals $S_0'(z)$ and $S_1'(z)$) is thus obtained by making use of scaling values $a_0$ and $a_1$ and delay values $d_0$ and $d_1$, which are more and more optimized along the iterations.

At block 520, normalizations are performed to the signals $S_0'(z)$ and $S_1'(z)$. An example of normalization is provided by formula (7), represented as the following quotient:

$$P_i(n) = \frac{|s_i'(n)|}{\|\|s_i'\|\|_1} \tag{7}$$

Here, i=0,1, indicating that there is a normalized value $P_0(n)$ for the input signal $M_0$ and a normalized value $P_1(n)$ for the input signal $M_1$. The index n is the time index of the time domain input signal. Here, $s_i'(n)$ is the time domain sample index (it is not a z transform) of the signal $M_i$ (with i=0, 1). $|s_i'(n)|$ indicates that the magnitude (e.g. absolute value) of $s_i'(n)$ obtained and is therefore positive or, at worse, 0. This implies that the numerator in formula (7) is positive or, at worse, 0. $\|\|s_i'\|\|_1$ indicates that the denominator in formula (7) is formed by the 1-norm of the vector $s_i'$. The 1-norm $\|\| \ldots \|\|_1$ indicates the sum of the magnitudes $|s_i'(n)|$, where n goes over the signal samples, e.g. up to the present index (e.g., the signal samples may be taken within a predetermined window from a past index to the present index). Hence, $\|\|s_i'\|\|_1$ (which is the denominator in formula (7)) is positive (or is 0 in some cases). Moreover, it is $|s_i'(n)| \leq \|\|s_i'\|\|_1$, which implies that $0 \leq P_i(n) \leq 1$ (i=0,1). Further, also the following is verified:

$$\sum_n \frac{s_i'(n)}{\|\|s_i'\|\|_1} = 1$$

It has been therefore noted that $P_0(n)$ and $P_1(n)$ can be artificially considered as probabilities since, by adopting equation (7), they verify:
1. $P_i(n) \geq 0, \forall n$
2. $\sum_{n=0}^{\infty} P_i(n) = 1$ with i=0,1 (further discussion is provided here below). "∞" is used for mathematical formalism, but can approximated over the considered signal.

It is noted that other kinds of normalizations may be provided, and not only those obtained through formula (7).

FIG. 5 shows block 530 which is input by the normalized values 522 and outputs a similarity value (or the similarity value) 532, giving information between the first and second input values $M_0$ and $M_1$. Block 530 may be understood as a block which measures a metrics that gives an indication of how much the input signals $M_0$ and $M_1$ are similar (or dissimilar) to each other.

It has been understood that the metrics chosen for indicating the similarity or dissimilarity between the first and second input values may be the so-called Kullback-Leibler Divergence (KLD). This can be obtained using formulas (6) or (8):

$$D_{KL}(P\|Q) = \sum_n P(n) \log\left(\frac{P(n)}{Q(n)}\right) \quad (6)$$

$$D(P_0, P_1) = -\sum_n \left[P_0(n) \cdot \log\left(\frac{P_0(n)}{P_1(n)}\right) + P_1(n) \cdot \log\left(\frac{P_1(n)}{P_0(n)}\right)\right] \quad (8)$$

Figure 7:
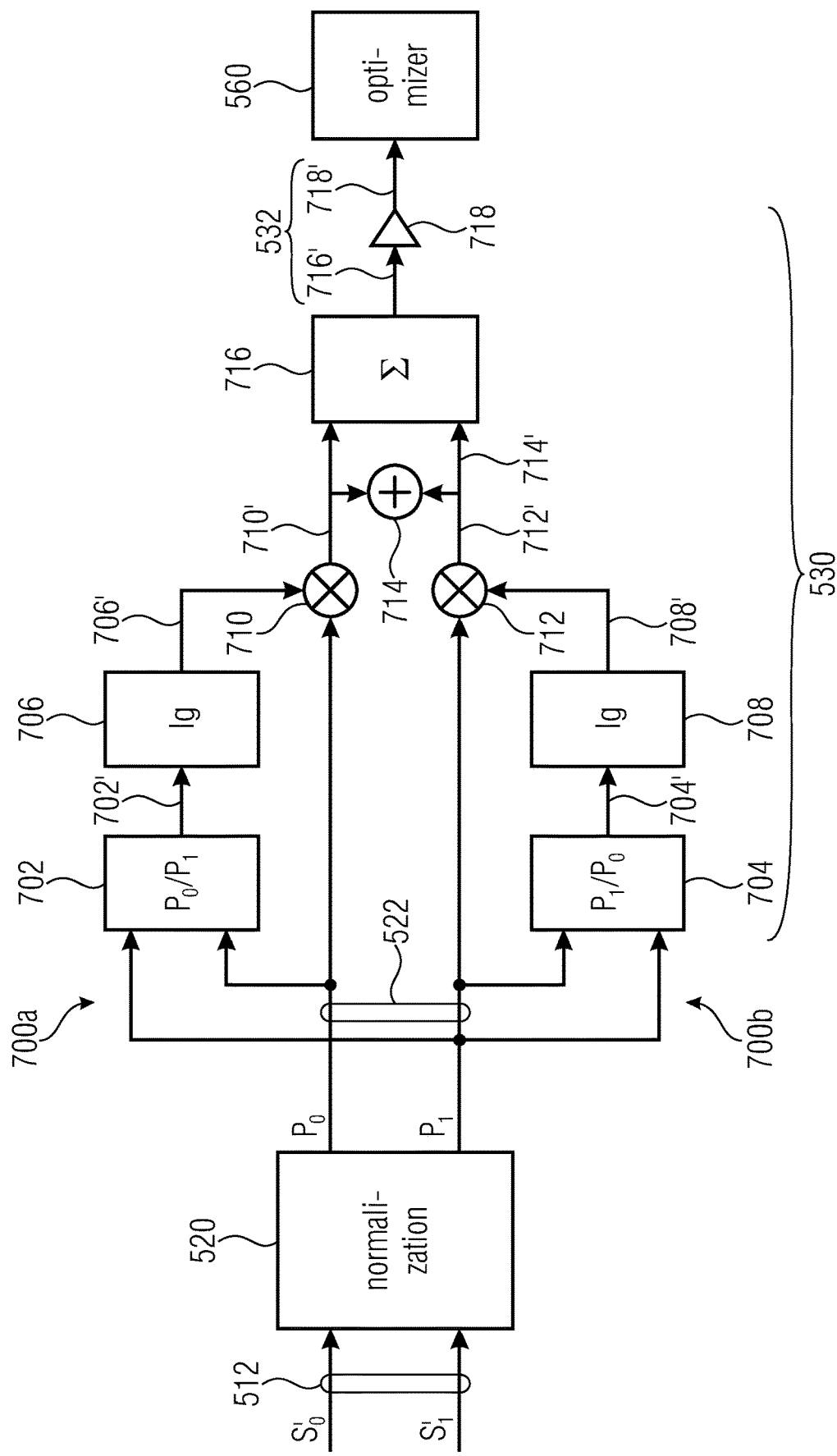
FIG. 7 shows elements of the apparatus of FIG. 5.

A discussion on how to obtain the Kullback-Leibler Divergence (KLD) is now provided. FIG. 7 shows an example of block 530 downstream to block 520 of FIG. 5. Block 520 therefore provides $P_0(n)$ and $P_1(n)$ (522), e.g. using the formula (7) as discussed above (other techniques may be used). Block 530 (which may be understood as a Kullback-Leibler processor or KL processor) may be adapted to obtain a metrics 532, which is in this case the Kullback-Leibler Divergence as calculated in formula (8).

With reference to FIG. 7, at a first branch 700a, a quotient 702' between $P_0(n)$ and $P_1(n)$ is calculated at block 702. At block 706, a logarithm of the quotient 702' is calculated, hence, obtaining the value 706'. Then, the logarithm value 706' may be used for scaling the normalized value $P_0$ at scaling block 710, hence, obtaining a product 710'. At a second branch 700b, a quotient 704' is calculated at block 704. The logarithm 708' of the quotient 704' is calculated at block 704. Then, the logarithm value 708' is used for scaling the normalized value at scaling block 712, hence, obtaining the product 712'.

At adder block 714, the values 710' and 712' (as respectively obtained at branches 700a and 700b) are combined to each other. The combined values 714' are summed with each other and along the sample domain indexes at block 716. The added values 716' may be inverted at block 718 (e.g., scaled by −1) to obtain the inverted value 718'. It is to be noted that, while the value 716' can be understood as a similarity value, the inverted value 718' can be understood as a dissimilarity value. Either the value 716' or the value 718' may be provided as metrics 532 to the optimizer 560 as explained above (value 716' indicating similarity, value 718' indicating dissimilarity).

Hence, the optimizer block 530 may therefore permit to arrive at formula (8), i.e.

$$D(P_0, P_1) = -\sum_n \left[P_0(n) \log\left(\frac{P_0(n)}{P_1(n)}\right) + P_1(n) \log\left(\frac{P_1(n)}{P_0(n)}\right)\right].$$

In order to arrive at formula (6), e.g. $D_{KL}$, it could simply be possible to eliminate, from FIG. 7, blocks 704, 708, 712 and 714, and substitute $P_0$ with P and $P_1$ with Q.

The Kullback-Leibler divergence was natively conceived for giving measurements regarding probabilities and is in principle, unrelated to the physical significance of the input signals $M_0$ and $M_1$. Notwithstanding, the inventors have understood that, by normalizing the signals $S_0'$ and $S_1'$ and obtaining normalized values such as $P_0(n)$ and $P_1(n)$, the Kullback-Leibler Divergence provides a valid metrics for measuring the similarity/dissimilarity between the input signals $M_0$ and $M_1$. Hence, it is possible to consider the normalized magnitude values of the time domain samples as probability distributions, and after that, it is possible to measure the metrics (e.g., as the Kullback-Leibler divergence, e.g. as obtained though formula (6) or (8)).

Reference is now made to FIG. 5 again. For each iteration, the metrics 532 provides a good estimate of the validity of the scaling values $a_0$ and $a_1$ and the delay values $d_0$ and $d_1$. Along the iterations, the different candidate values for the scaling values $a_0$ and $a_1$ and the delay values $d_0$ and $d_1$ will be chosen among those candidates, which presents the lowest similarity or highest dissimilarity.

Block 560 (optimizer) is input by the metrics 532 and outputs candidates 564 (vector) for the delay values $d_0$ and $d_1$ and the scaling values $a_0$ and $a_1$. The optimizer 560 may measure the different metrics obtained for different groups of candidates $a_0$, $a_1$, $d_0$, $d_1$, change them, and choose the group of candidates associated to the lowest similarity (or highest dissimilarity) 532. Hence, the output 504 (output signals $S_0'(z)$, $S_1'(z)$) will provide the best approximation. The candidate values 564 may be grouped in a vector, which can be subsequently modified, for example, through a random technique (FIG. 5 shows a random generator 540 providing a random input 542 to the optimizer 560). The optimizer 560 may make use of weights through which the candidate values 564 ($a_0$, $a_1$, $d_0$, $d_1$) are scaled (e.g., randomly). Initial coefficient weights 562 may be provided, e.g., by default. An example of processing of the optimizer 560 is provided and discussed profusely below ("algorithm 1"). Possible correspondences between the lines of the algorithm and elements of FIG. 5 are also shown in FIG. 5.

As may be seen, the optimizer 564 outputs a vector 564 of values $a_0$, $a_1$, $d_0$, $d_1$, which are subsequently reused at the mixing block 510 for obtaining new values 512, new normalized values 522, and new metrics 532. After a certain number of iterations (which could be for example predefined) a maximum numbers of iterations may be, for example, a number chosen between 10 and 20. Basically, the optimizer 560 may be understood as finding the delay and iteration values, which minimize an objective function, which could be, for example, the metrics 532 obtained at block 530 and/or using formulas (6) and (8).

It has been therefore understood that the optimizer 560 may be based on a random direction optimization technique, such that candidate parameters form a candidates' vector [e.g., with four entries, e.g. corresponding to 564, $a_0$, $a_1$, $d_0$, $d_1$], wherein the candidates' vector is iteratively refined by modifying the candidates' vector in random directions.

Basically, the candidates' vector (indicated the subsequent values of $a_0$, $a_1$, $d_0$, $d_1$) may be iteratively refined by modifying candidate vectors in random directions. For example, following the random input 542, different candidate values may be modified by using different weights that vary randomly. Random directions may mean, for example, that while some candidate values are increased, other candidate values are decreased, or vice versa, without a predefined rule. Also the increments of the weights may be random, even though a maximum threshold may be predefined.

The optimizer 460 may be so that candidate parameters [$a_0$, $a_1$, $d_0$, $d_1$] form a candidates' vector, wherein, for each iteration, the candidates' vector is perturbed [e.g., randomly] by applying a vector of uniformly distributed random numbers [e.g., each between −0.5 and +0.5], which are element-wise multiplied by (or added to) the elements of the candidates' vector. It is therefore possible to avoid gradient processing, e.g., by using random direction optimization. Hence, by randomly perturbing the vector of coefficients, it is possible to arrive, step by step, to the advantageous values of $a_0$, $a_1$, $d_0$, $d_1$ and to the output signal 504 in which the combined sounds $S_0$ and $S_1$ are appropriately compensated. The algorithm is discussed below with a detailed description.

In the present examples, reference is made to a multi-channel input signal 502 formed by two input channels (e.g., $M_0$, $M_1$). Anyway, the same examples above also apply also for more than two channels.

In the examples, the logarithms may be in any base. It may be imagined that the base discussed above is 10.

Detailed Discussion of the Technique

One goal is a system for teleconferencing, for the separation of two speakers, or a speaker and a musical instrument or noise source, in a small office environment, not too far from a stereo microphone, as in available stereo webcams. The speakers or sources are assumed to be on opposing (left-right) sides of the stereo microphone. To be useful in real time teleconferencing, we want it to work online with as low delay as possible. For comparison, in this paper we focus on an offline implementation. Proposed approach works in time domain, using attenuation factors and fractional delays between microphone signals to minimize cross-talk, the principle of a fractional delay and sum beamformer. Compared to other approaches this has the advantage that we have a lower number of variables to optimize, and we dont have the permutation problem of ICA like approaches in the frequency domain. To optimize the separation, we minimize the negative Kullback-Leibler derived objective function between the resulting separated signals. For the optimization we use a novel algorithm of "random directions", without the need for gradients, which is very fast and robust. We evaluate our approach on convolutive mixtures generated from speech signals taken from the TIMIT data-set using a room impulse response simulator, and with real-life recordings. The results show that for the proposed scenarios our approach is competitive with regard to its separation performance, with a lower computational complexity and system delay to the Prior-Art approaches.

Index Terms—Blind source separation, time domain, binaural room impulse responses, optimization 1. Introduction, Previous Approaches Our system is for applications where we have two microphones and want to separate two audio sources. This could be for instance a teleconferencing scenario with a stereo webcam in an office and two speakers around it, or for hearing aids, where low computational complexity is important.

Previous approaches: An early previous approach is Independent Components Analysis (ICA). It can unmix a mix of signals with no delay in the mixture. It finds the coefficients of the unmixing matrix by maximizing non-gaussianity or maximizing the Kullback-Leibler Divergence [1, 2]. But for audio signals and a stereo microphone pair we have propagation delay, in general convolutions with the room impulse responses [3], in the mix. Approaches to deal with it often apply the Short Time Fourier Transform (STFT) to the signals [4], e.g., AuxIVA [5] and ILRMA [6, 7]. This converts the signal delay into a complex valued factors in the STFT subbands, and a (complex valued) ICA can be applied in the resulting subbands (e.g. [8]).

Problem: A problem that occurs here is a permutation in the sub-bands, the separated sources can appear in different orders in different subbands; and the gain for different sources in different subbands might be different, leading to a modified spectral shape, a spectral flattening. Also we have a signal delay resulting from applying an STFT. It needs the assembly of the signal into blocks, which needs a system delay corresponding to the block size [9, 10].

Time domain approaches, like TRINICON [11], or approaches that use the STFT with short blocks and more microphones [12, 13], have the advantage that they don't have a large blocking delay of the STFT, but they usually have a higher computational complexity, which makes them hard to use on small devices.

Figure 1:
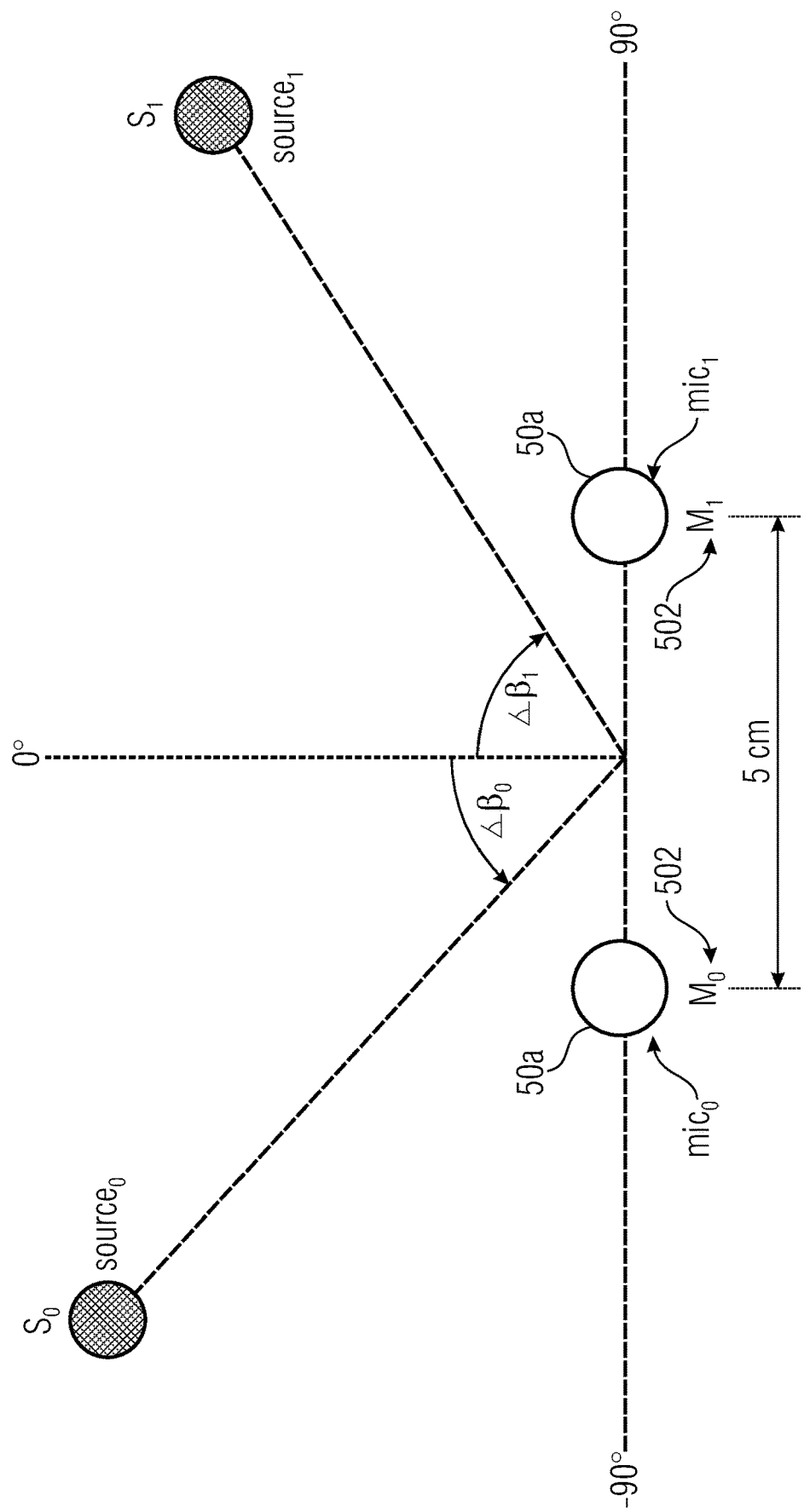
FIG. 1 shows a layout of microphones and sources useful to understand the invention.

See also FIG. 1, showing a setup of loudspeakers and microphones in the simulation 2. Proposed Approach To avoid the processing delays associated with frequency domain approaches, we use a time domain approach. Instead of using FIR filters, we use IIR filters, which are implemented as fractional delay allpass filters [14, 15], with an attenuation factor, the principle of a fractional delay and sum or adaptive beamformer [16, 17, 18]. This has the advantage that each such filter has only 2 coefficients, the fractional delay and the attenuation. For the 2-channel stereo case this leads to a total of only 4 coefficients, which are then easier to optimize. For simplicity, we don't do a dereverberation either, we focus on the crosstalk minimization. In effect we model the Relative Transfer Function between the two microphones by an attenuation and a pure fractional delay. We then apply a novel optimization of "random directions", similar to the "Differential Evolution" method.

We assume a mixture recording from 2 sound sources ($S_0$ and $S_1$) made with 2 microphones ($M_0$ and $M_1$). However, the same result are also valid for more than two sources. The sound sources may be assumed to be in fixed positions as shown in FIG. 1. In order to avoid the need for modeling of non-causal impulse responses the sound sources have to be in different half-planes of the microphone pair (left-right).

Instead of the commonly used STFT, we may use the z-transform for the mathematical derivation, because it does not need the decomposition of the signal into blocks, with its associated delay. This makes it suitable for a time domain implementation with no algorithmic delay. Remember the (1-sided) z-transform of a time domain signal x(n), with sample index n, is defined as $X(z)=\Sigma_{n=0}^{\infty}x(n)z^{-n}$. We use capital letter to denote z-transform domain signals.

Let us define $s_0(n)$ and $s_1(n)$ as our two time domain sound signals at the time instant (sample index) n, and their z-transforms as $S_0(z)$ and $S_1(z)$. The two microphone signals (collectively indicated with 502) are $m_0(n)$ and $m_1(n)$, and their z-transforms are $M_0(z)$ and $M_1(z)$ (FIG. 2).

The Room Impulse Responses (RIRs) from the i's source to the j's microphone are $h_{i,j}(n)$, and their z-transform $H_{i,j}(z)$. Thus, our convolutive mixing system can be described in the z-domain as $$\begin{bmatrix} M_0(z) \\ M_1(z) \end{bmatrix} = \begin{bmatrix} H_{0,0}(z) & H_{1,0}(z) \\ H_{0,1}(z) & H_{1,1}(z) \end{bmatrix} \cdot \begin{bmatrix} S_0(z) \\ S_1(z) \end{bmatrix} \quad (1)$$

In simplified matrix multiplication we can rewrite Equation (1) as $$M(z)=H(z)\cdot S(z) \quad (2)$$

For an ideal sound source separation we would need to invert the mixing matrix H(z). Hence, our sound sources could be calculated as $$S(z) = \quad (3)$$
$$H^{-1}(z)M(z) \Rightarrow \begin{bmatrix} S_0(z) \\ S_1(z) \end{bmatrix} = \begin{bmatrix} H_{1,1}(z) & -H_{1,0}(z) \\ -H_{0,1}(z) & H_{0,0}(z) \end{bmatrix} \cdot \frac{1}{\det(H(z))} \cdot \begin{bmatrix} M_0(z) \\ M_1(z) \end{bmatrix}$$

Since det (H(z)) and diagonal elements of the inverse matrix are linear filters which do not contribute to the unmixing, we can neglect them for the separation, and bring them to the left side of eq. (3). This results in $$\begin{bmatrix} H_{1,1}^{-1}(z) & 0 \\ 0 & H_{0,0}^{-1}(z) \end{bmatrix} \cdot \begin{bmatrix} S_0(z) \\ S_1(z) \end{bmatrix} \cdot \det(H(z)) = \quad (4)$$
$$\begin{bmatrix} 1 & -H_{1,1}^{-1}(z)H_{1,0}(z) \\ -H_{0,0}^{-1}(z)H_{0,1}(z) & 1 \end{bmatrix} \cdot \begin{bmatrix} M_0(z) \\ M_1(z) \end{bmatrix}$$

where $H_{1,1}^{-1}(z) \cdot H_{1,0}(z)$ and $H_{0,0}^{-1}(z) \cdot H_{0,1}(z)$ are now relative room transfer functions.

Next we approximate these relative room transfer functions by fractional delays by $d_i$ samples and attenuation factors $a_i$, $$H_{i,i}^{-1}(z)\cdot H_{i,j}(z) \approx a_i z^{-d_i} \quad (5)$$

where $i,j \in \{0,1\}$.

This approximation works particularly well when reverberation or echo is not too strong. For the fractional delays by $d_i$ samples we use the fractional delay filter in the next section (2.1). Note that for simplicity we keep the linear filter resulting from the determinant and from the matrix diagonal $H_{i,i}(z)$ on the left-hand side, meaning there is no dereverberation.

An example is provided here with reference to FIG. 1: assume two sources in a free field, without any reflections, symmetrically on opposing sides around a stereo microphone pair. The distance (in samples) of $source_0$ to the near microphone shall be $m_0=50$ samples, to the far microphone $m_1=55$ samples. The sound amplitude shall decay according to the function $k/(m_i^2)$ with some constant k. Then the room transfer functions in the z-domain are $H_{0,0}(z)=H_{1,1}(z)=k/50^2 \cdot z^{-50}$ and $$H_{0,1}(z) = H_{1,0}(z) = \frac{k}{55^2}\cdot z^{-55},$$

and one relative room transfer function is $$H_{0,0}^{-1}(z)\cdot H_{0,1}(z) = \frac{50^2}{55^2}\cdot z^{-5},$$

the same for the other relative room transfer function. We see that in this simple case the relative room transfer function is indeed $0.825 \cdot z^{-5}$, exactly an attenuation and a delay. The signal flowchart of convolutive mixing and demixing process can be seen in FIG. 2b. (FIG. 2b: Signal block diagram of convolutive mixing and demixing process).

2.1. The Fractional Delay Allpass Filter

The fractional delay allpass filter for implementing the delay $z^{d_i}$ of eq. (5) plays an important role in our scheme, because it produces an IIR filter out of just a single coefficient, and allows for implementation of a precise fractional delay (where the precise delay is not an integer value), needed for good cross-talk cancellation. The IIR property also allows for an efficient implementation. [14, 15] describes a practical method for designing fractional delay allpass filters, based on IIR filters with maximally flat group delay [19]. We use the following equations to obtain the coefficients for our fractional delay allpass filter, for a fractional delay $\tau=d_i$. Its transfer function in the z-domain is A(z), with [14]

$$A(z) = \frac{z^{-L}D\left(\frac{1}{z}\right)}{D(z)}$$

where D (z) is of order $L=[\tau]$, defined as:

$$D(z) = 1 + \sum_{n=1}^{L} d(n)z^{-n}$$

The filter d(n) is generated as:

$$d(0) = 1,$$
$$d(n+1) = d(n)\cdot \frac{(L-n)(L-n-\tau)}{(n+1)(n+1+\tau)}$$

for $0 \leq n \leq (L-1)$.

2.2. Objective Function

As objective function, we use a function D ($P_0$, $P_1$) which is derived from the Kullback-Leibler Divergence (KLD), $$D_{KL}(P\|Q) = \sum_n P(n)\cdot \log\left(\frac{P(n)}{Q(n)}\right) \quad (6)$$

where P(n) and Q(n) are probability distributions of our (unmixed) microphones channels, and n runs over the discrete distributions.

In order to make the computation faster we avoid computing histograms. Instead of the histogram we use the normalized magnitude of the time domain signal itself, $$P_i(n) = \frac{|s_i'(n)|}{\|s_i'\|_1} \quad (7)$$

where n now is the time domain sample index. Notice, that $P_i(n)$ has similar properties with that of a probability, namely:
1. $P_i(n) \leq 0$, $\forall n$.
2. $\Sigma_{n=0}^{\infty} P_i(n) = 1$.

with i=0, 1. Instead of using the Kullback-Leibler Divergence directly, we turn our objective function into a symmetric (distance) function by using the sum $D_{KL}(P\|Q)+D_{KL}(Q\|P)$, because this makes our separation more stable between the two channels. In order to apply minimization instead of maximization, we take its negative value. Hence our resulting objective function $D(P_0, P_1)$ is $$D(P_0, P_1) = -\sum_n \left[ P_0(n) \cdot \log\left(\frac{P_0(n)}{P_1(n)}\right) + P_1(n) \cdot \log\left(\frac{P_1(n)}{P_0(n)}\right) \right] \quad (8)$$

2.3. Optimization

A widespread optimization method for BSS is Gradient Descent. This has the advantage that it finds the "steepest" way to an optimum, but it involves the computation of gradients, and gets easily stuck in local minima or is slowed down by "narrow valleys" of the objective function. Hence, for the optimization of our coefficients we use a novel optimization of "random directions", similar to "Differential Evolution" [20, 21, 22]. Instead of differences of coefficient vectors for the update, we use a weight vector to model the expected variance distribution of our coefficients. This leads to a very simple yet very fast optimization algorithm, which can also be easily applied to real time processing, which is important for real time communications applications. The algorithm starts with a fixed starting point [1.0, 1.0, 1.0, 1.0], which we found to lead to robust convergence behaviour. Then it perturbs the current point with a vector of uniformly distributed random numbers between −0.5 and +0.5 (the random direction), element-wise multiplied with our weight vector (line 10 in Algorithm 1). If this perturbed point has a lower objective function value, we choose it as our next current point, and so on. The pseudo code of the optimization algorithm can be seen in Algorithm 1. Where, minabskl_i (indicated as negabskl_i in Algorithm 1) is our objective function that computes KLD from the coefficient vector coeffs and the microphone signals in array X.

We found that 20 iterations (and hence only 20 objective function evaluations) are already sufficient for our test files (each time the entire file), which makes this a very fast algorithm.

The optimization may be performed, or example, at block 560 (see above).

Algorithm 1 is shown here below.

| Algorithm 1 Optimization algorithm |
| --- |
| 1:    procedure OPTIMIZE SEPARATION COEFFICIENTS(X) |
| 2:       INITIALIZATION |
| 3:          X ← convolutive mixture |

-continued

| Algorithm 1 Optimization algorithm |
| --- |
| 4:          init_coeffs = [1.0, 1.0, 1.0, 1.0] ← initial guess for separation coefficients |
| 5:          coeffweights ← weights for random search |
| 6:          coeffs = init_coeffs ← separation coefficients |
| 7:          negabskl_0(coeffs, X) ← calculation of KLD |
| 8:       OPTIMIZATION ROUTINE |
| 9:          loop: |
| 10:            coeffvariation=(random(4)*coeffweights) ← random variation of separation coefficients |
| 11:            negabskl_1 (coeffs+coeffvariation, X) ← calculation of new KLD |
| 12:            if negabskl_1 < negabskl_0 then |
| 13:               negabskl_0 = negabskl_1 |
| 14:               coeffs = coeffs+coeffvariation ← update separation coefficients |

3. Experimental Results

In this section, we evaluate the proposed time domain separation method, which we call AIRES (time domAIn fRactional dElay Separation), by using simulated room impulse responses and different speech signals from the TIMIT data-set [23]. Moreover, we made real-life recordings in real room environments. In order to evaluate the performance of our proposed approach, comparisons with Stateof-the-Art BSS algorithms were done, namely, time-domain TRINICON [11], frequency-domain AuxIVA [5] and ILRMA [6, 7]. An implementation of the TRINICON BSS has been received from its authors. Implementations of AuxIVA and ILRMA BSS were taken from [24] and [25], respectively. The experiment has been performed using MATLAB R2017a on a laptop with CPU Core i7 8-th Gen. and 16 Gb of RAM.

3.1. Separation Performance with Synthetic RIRs

Figure 3:
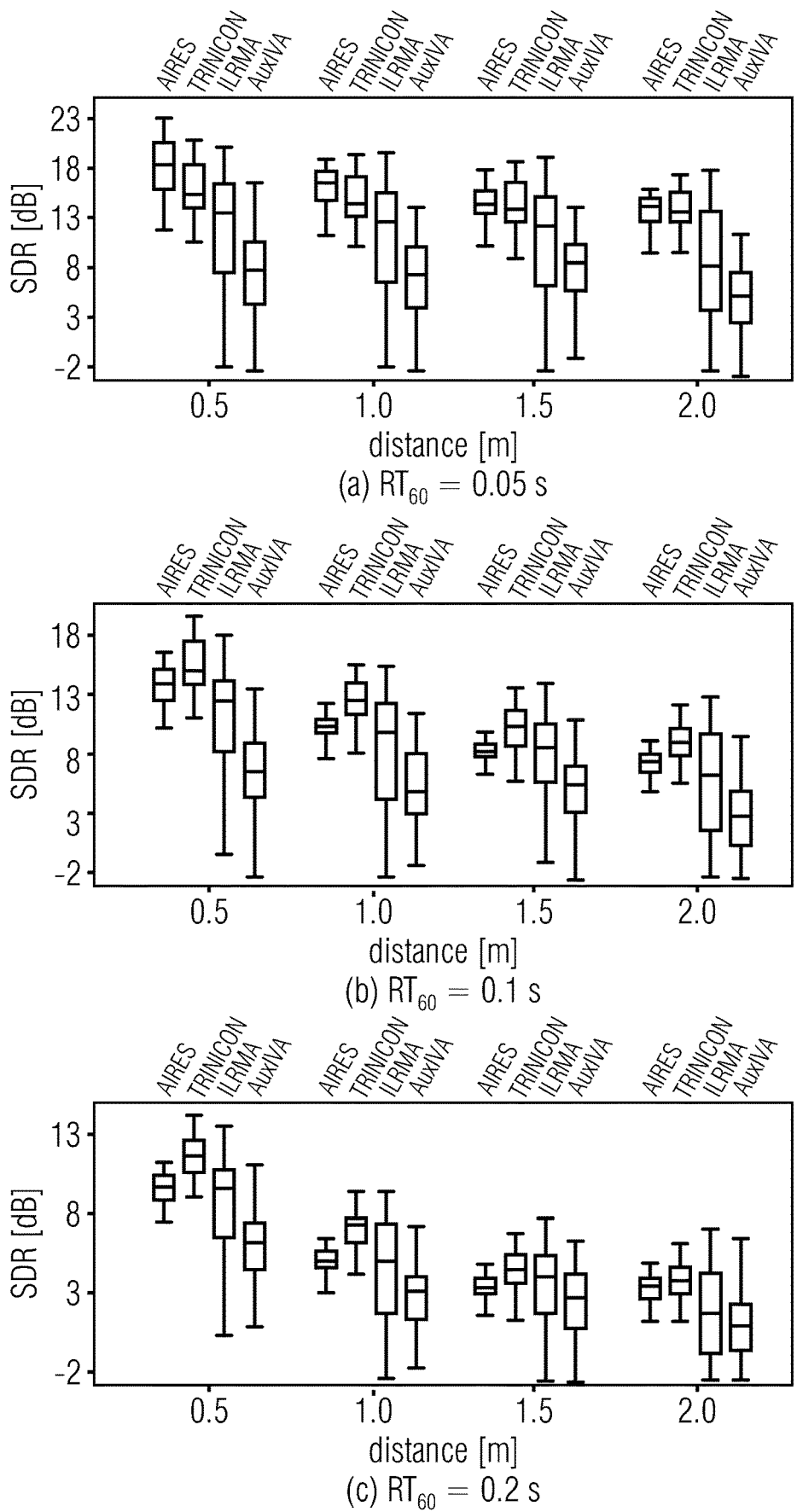
FIG. 3 shows performance evaluation of BSS algorithm applied to simulated data.
Figure 4:
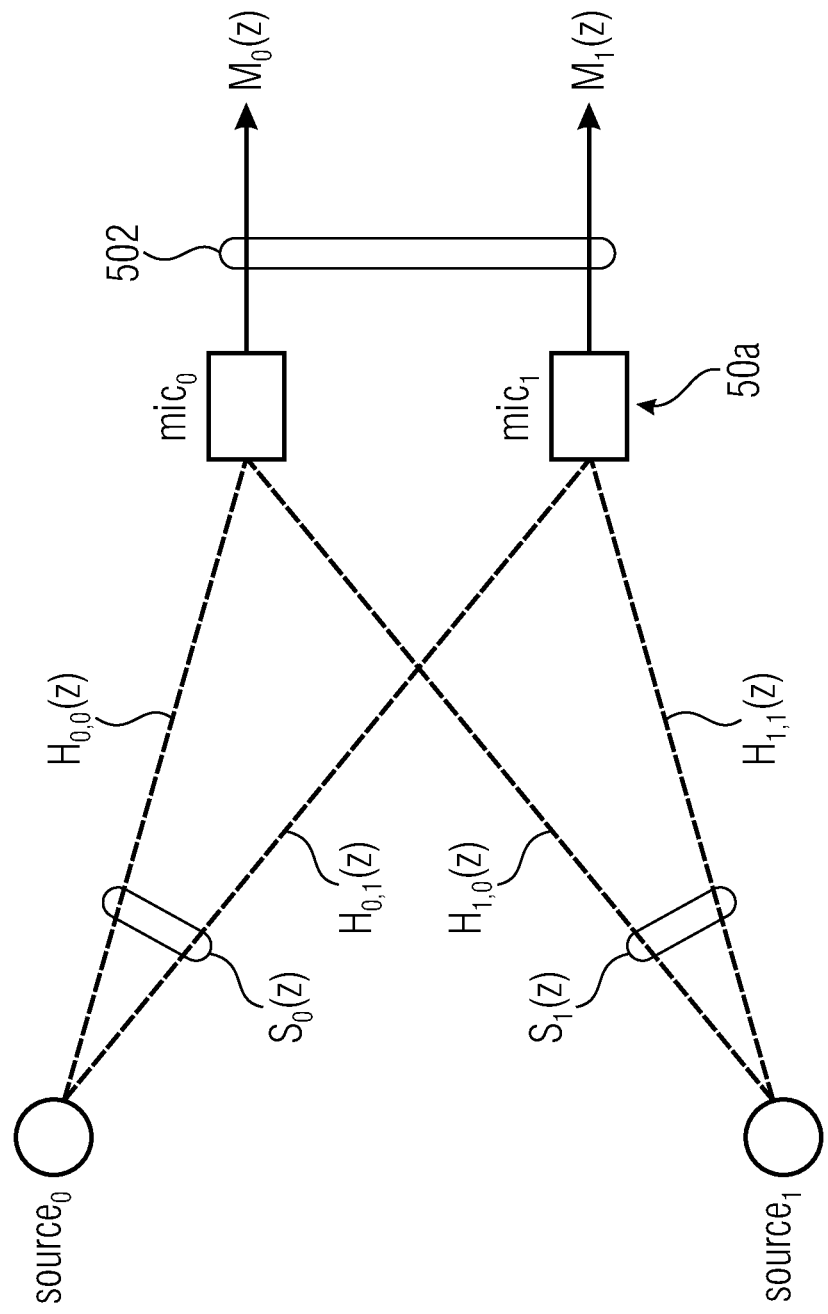
FIG. 4 shows a layout of microphones and sound sources useful to understand the invention.

The room impulse response simulator based on the image model technique [26, 27] was used to generate room impulse responses. For the simulation setup the room size have been chosen to be 7 m×5 m×3 m. The microphones were positioned in the middle of the room at [3.475, 2.0, 1.5]m and [3.525, 2.0, 1.5]m, and the sampling frequency was 16 kHz. Ten pairs of speech signals were randomly chosen from the whole TIMIT data-set and convolved with the simulated RIRs. For each pair of signals, the simulation was repeated 16 times for random angle positions of the sound sources relatively to microphones, for 4 different distances and 3 reverberation times (RT60). The common parameters used in all simulations are given in Table 1 and a visualization of the setup can be seen in FIG. 1. The evaluation of the separation performance was done objectively by computing the Signal-to-Distortion Ratio (SDR) measure [28], as the original speech sources are available, and the computation time. The results are shown in FIG. 3.

The obtained results show a good performance of our approach for reverberation times smaller than 0.2 s. For RT60=0.05 s the average SDR measure over all distances is 15.64 dB and for RT60=0.1 s it is 10.24 dB. For a reverberation time RT60=0.2 s our proposed BSS algorithm shares second place with ILRMA after TRINICON. The average computation time (on our computer) over all simulations can be seen in Table 2. As can be seen, AIRES outperforms all State-of-the-Art algorithms in terms of computation time.

By listening to the results we found that an SDR of about 8 dB results in good speech intelligibility, and our approach indeed features no unnatural sounding artifacts.

TABLE 1

Parameters used in simulation:

| | |
|---|---|
| Room dimensions | 7 m × 5 m × 3 m |
| Microphones displacement | 0.05 m |
| Reverberation time $RT_{60}$ | 0.05, 0.1, 0.2 s |
| Amount of mixes | 10 random mixes |
| Conditions for each mix | 16 random angles × 4 distances |

Characterization of FIG. 3 (showing performance evaluation of BSS algorithms applied to simulated data):
(a) RT60=0.05 s
(b) RT60=0.1 s
(c) RT60=0.2 s

TABLE 2

Comparison of average computation time (simulated datasets).

| BSS | AIRES | TRINICON | ILRMA | AuxIVA |
|---|---|---|---|---|
| Computation time | 0.05 s | 23.4 s | 4.4 s | 0.6 s |

3.2. Real-Life Experiment

Finally, to evaluate the proposed sound source separation method, a real-life experiment was conducted. The real recordings have been captured in 3 different room types. Namely, in a small apartment room (3 m×3 m), in an office room (7 m×5 m) and in a big conference room (15 m×4 m). For each room type, 10 stereo mixtures of two speakers have been recorded. Due to the absence of "ground truth" signals, in order to evaluate separation performance the mutual information measure [29] between separated channels has been calculated. The results can be seen in Table 3. Please note, that the average mutual information of the mixed microphone channels is 1.37, and the lower the mutual information between the separated signal the better the separation.

TABLE 3

Comparison of separation performance using Mean Mutual Information (MI, real recordings).

| BSS | AIRES | TRINICON | ILRMA | AuxIVA |
|---|---|---|---|---|
| Mean MI | 0.5 | 0.47 | 0.52 | 0.52 |
| Mean Computation time | 0.22 s | 120.2 s | 7.86 s | 1.5 s |

From the comparison Table 3 it can be seen that the performance tendency for the separation of the real recorded convolutive mixtures stayed the same as for simulated data. Thus, one can conclude that AIRES despite its simplicity can compete with Prior-Art blind source separation algorithms.

4. Conclusions

In this paper, we presented a fast time-domain blind source separation technique based on the estimation of IIR fractional delay filters to minimize crosstalk between two audio channels. We have shown that estimation of the fractional delays and attenuation factors results in a fast and effective separation of the source signals from stereo convolutive mixtures. For this, we introduced an objective function which was derived from the negative Kullback-Leibler Divergence. To make the minimization robust and fast, we presented a novel "random directions" optimization method, which is similar to the optimization of "differential evolution". To evaluate the proposed BSS technique, a set of experiments was conducted. We evaluated and compared our system with other State-of-the-Art methods on simulated data and also real room recordings. Results show that our system, despite its simplicity, is competitive in its separation performance, but has much lower computational complexity and no system delay. This also enables an online adaption for real time minimum delay applications and for moving sources (like a moving speaker). These properties make AIRES well suited for real time applications on small devices, like hearing aids or small teleconferencing setups. A test program of AIRES BSS is available on our GitHub [30].

Further Aspects (See Also Examples Above and/or Below)

Further aspects are here discussed, e.g. regarding a Multichannel or stereo audio source separation method and update method for it. It minimizes an objective function (like mutual information), and uses crosstalk reduction by taking the signal from the other channel(s), apply an attenuation factor and a (possible fractional) delay to it, and subtract it from the current channel, for example. It uses the method of "random directions" to update the delay and attenuation coefficients, for example.

See also the following aspects:
1: A multichannel or stereo source separation method, whose coefficients for the separation are iteratively updated by adding a random update vector, and if this update results in an improved separation, keeping this update for the next iteration; otherwise discard it.
2: A method according to aspect 1 with suitable fixed variances for the random update for each coefficient.
3: A method according to aspect 1, or 2, where the update occurs on a live audio stream, where the update is based on past audio samples.
4: A method according to aspect 1, 2 or 3, where the variance of the update is slowly reduced over time.

Other aspects may be:
1) A method of online optimization of parameters, which minimizes an objective function with a multi-dimensional input vector x, by first determining a test vector from a given vicinity space, then update the previous best vector with the search vector, and if the such obtained value of the objective function, this updated vector becomes the new best, otherwise it is discarded.
2) Method of aspect 1, applied to the task of separating N sources in an audio stream of N channels, where coefficient vector consists of delay and attenuation values needed to cancel unwanted sources.
3) Method of aspect 2, applied to task of teleconferencing with more than 1 speaker on one or more sites.
4) Method of aspect 2, applied to the task of separating audio sources before encoding them with audio encoders.
5) Method of aspect 2, applied to the task of separating a speech source from music or noise source(s).

Additional Aspects

Additional aspects are here discussed.

Introduction Stereo Separation

A goal is to separate sources with multiple microphones (here: 2). Different microphones pick up sound with different amplitudes and delays. Discussion below takes into account programming examples in Python. This is for easier understandability, to test if and how algorithms work, and for reproducibility of results, to make algorithms testable and useful for other researchers.

Other Aspects

Here below, other aspects are discussed. They are not necessarily bounded with each other, but that may be combined for creating new embodiments. Each bullet point may be independent from the other ones and may, alone or in combination with other features (e.g. other bullet points), or other features discussed above or below complement or further specify at least some of the examples above and/or below and/or some of the features disclosed in the claims.

Spatial Perception

The ear mainly uses 2 effects to estimate the special direction of sound:
Interaural Level Differences (ILD)
Interaural Time Differences (ITD)
Music from studio recordings mostly use only level differences (no time differences), called "panning".
Signal from stereo Microphones, for instance from stereo webcams, show mainly time differences, and not much level differences.

Stereo Recording with Stereo Microphones
The setup with stereo microphones with time differences.
Observe: The effect of the sound delays from the finite speed of sound and attenuations can be described by a mixing matrix with delays.
See FIG. 2a: A stereo teleconferencing setup. Observe the signal delays between the microphones.

Stereo Separation, ILD
The case with no time differences (panning only) is the easier one
Normally, Independent Component Analysis is used
It computes an "unmixing" matrix which produces statistically independent signals.
Remember: joint entropy of two signals X and Y is $H(X, Y)$
The conditional entropy is $H(X|Y)$
Statistically independent also means: $H(X|Y)=H(X)$, $H(X, Y)=H(X)+H(Y)$
Mutual information: $I(X, Y)=H(X, Y)-H(X|Y)-H(Y|X) \geq 0$, for independence it becomes 0
In general the optimization minimizes this mutual information.

ITD Previous Approach
The ITD case with time differences is more difficult to solve
The "Minimum Variance Principle" tries to suppress noise from a microphone array
It estimates a correlation matrix of the microphone channels, and applies a Principle Component Analysis (PCA) or Karhounen-Loeve Transform (KLT).
This de-correlates the resulting channels.
The channels with the lowest Eigenvalues are assumed to be noise and set to zero ITD Previous Approach Example
For our stereo case, we only get 2 channels, and compute and play the signals with the larger and smaller Eigenvalue: python KLT_separation.py
Observe: The channel with the larger Eigenvalue seem to have the lower frequencies, the other the (weaker) higher frequencies, which are often just noise.

ITD, New Approach
Idea: the unmixing matrix needs signal delays for unmixing, for inverting the mixing matrix
Important simplification: we assume only a single signal delay path between the microphones for each of the 2 sources.
In reality there are multiple delays from room reflections, but usually much weaker than the direct path.

Stereo Separation, ITD, New Approach

Assume a mixing matrix, with attenuations $a_i$ and delays of $d_i$ samples. In the z-transform domain, a delay by d samples is represented by a factor of $z^d$ (observe that the delay can be fractional samples):

$$A = \begin{bmatrix} 1 & a_0 z^{-d_0} \\ a_1 z^{-d_1} & 1 \end{bmatrix}$$

Hence the unmixing matrix is its inverse:

$$A^{-1} = \frac{1}{1 - a_0 z^{-d_0-d_1}} \cdot \begin{bmatrix} 1 & a_0 z^{-d_0} \\ a_1 z^{-d_1} & 1 \end{bmatrix}$$

It turns out we can simplify the unmixing matrix by dropping the fraction with the determinant in front of the matrix without sacrificing performance in practice.

Coefficient Computation

The coefficients $a_i$ and $d_i$ need to be obtained by optimization. We can again use minimization of the mutual information of the resulting signals to find the coefficients. For the mutual information we need the joint entropy. In Python we can compute it from the 2-dimensional probability density function using numpy.histogram2d. we call it with hist2d, xedges, yedges=np.histogram2d(x[:,0],x[:,1], bins=100)

Optimization of the Objective Function

Note that our objective function might have several minima! This means we cannot use convex optimization if its starting point is not sufficiently close to the global minimum.

Hence we need to use non-convex optimization Python has a very powerful non-convex optimization method:

scipy.optimize.differential_evolution. We call it with coeffs_minimized=opt.differential_evolution(mutualinfocoeffs, bounds, args=(X,),tol=1e-4, disp=True)

Alternative Objective Functions

But that is complex to compute. Hence we look for an alternative objective function which has the same minimum. We consider Kullback-Leibler and Itakura-Saito Divergences The Kullback-Leibler Divergence of 2 probability distributions P and Q, is defined as $$D_{KL}(P, Q) = \sum_{n=i} P(i) \cdot \log \frac{P(i)}{Q_1(i)}$$

i runs over the (discrete) distributions. To avoid computing histograms, we simply treat the normalized magnitudes of our time domain samples as a probability distribution as a trick. Since these are dissimilarity measure, they need to be maximized, hence their negative values need to be minimized.

Kullback-Leibler Python Function
In Python this objective function is
def minabsklcoeffs(coeffs,X):

```
#computes the normalized magnitude of the channels and then applies
#the Kullback-Leibler divergence
X_prime=unmixing(coeffs,X)
X_abs=np.abs(X_prime)
#normalize to sum( )=1, to make it look like a probability:
X_abs[:,0]=X_abs[:,0]/np.sum(X_abs[:,0]
X_abs[:,1]=X_abs[:,1]/np.sum(X_abs[:,1])
#print("Kullback-Leibler Divergence calculation")
abskl= np.sum( X_abs[:,0] * np.log((X_abs[:,0]+1e-6) /
(X_abs[:,1]+1e-6)) → )
return −abskl
```

(here minabsklcoeffs correspondd to minabsk_i in Algorithm 1)

Comparison of Objective Functions

We fix the coefficients except one of the delay coefficients, to compare the objective functions in a plot.

Figure 6A:
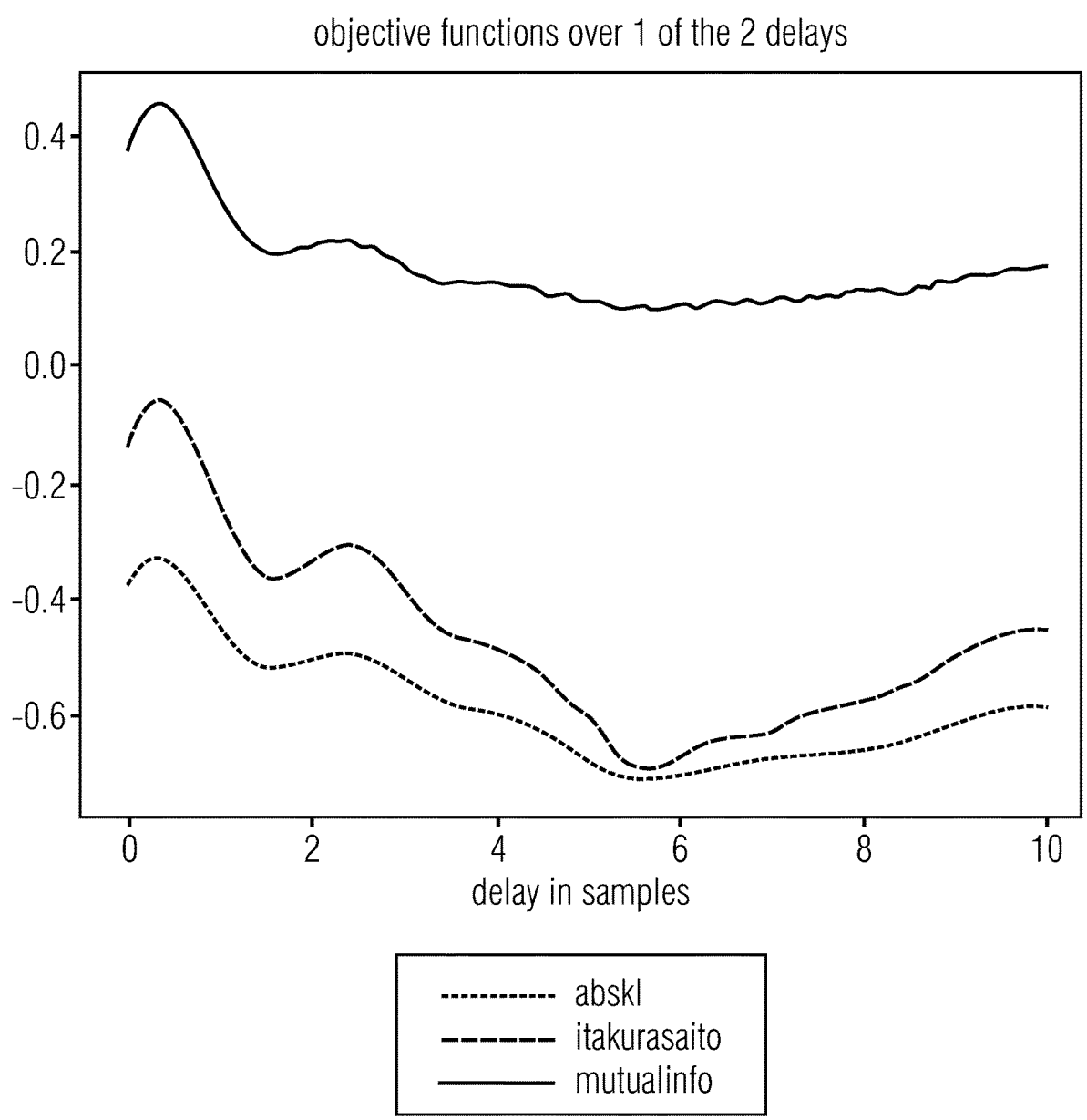
FIGS. 6a, 6b and 6c show results obtainable with the invention.

FIG. 6a shows objective functions for an example signal and example coefficients. Observe that the functions have indeed the same minima! "abskl" is Kullback-Leibler on the absolute values of the signal, and is the smoothest.

Optimization Examples

Optimization using mutual information: python ICAmutualinfo_puredelay.py (this needs ca. 121 slower iterations)

Optimization using Kullback-Leibler: python ICAabskl_puredelay.py (this needs ca. a. 39 faster iterations)

Listening to the resulting signals confirms that they are really separated enough for intelligibility, where they were not before.

Further Speeding up Optimization

To further speed up optimization we need to enable convex optimization. For that we need to have an objective function with only one minima (in the best case). Much of the smaller local minima come from quickly changing high frequency components of our signal. Approach: We compute the objective function based on a low passed and downsampled version of our signals (which also further speeds up the computation of the objective function). The lowpass needs to be narrow enough to remove the local minima, but broad enough to still obtain sufficiently precise coefficients.

Further Speeding Up Optimization, Low Pass

We choose the downsampling factor of 8, and accordingly a low pass of ⅛th of the full band. We use the following low pass filter, with bandwidth of about ⅛th of the full band (⅛th of the Nyquist frequency).

Figure 6B:
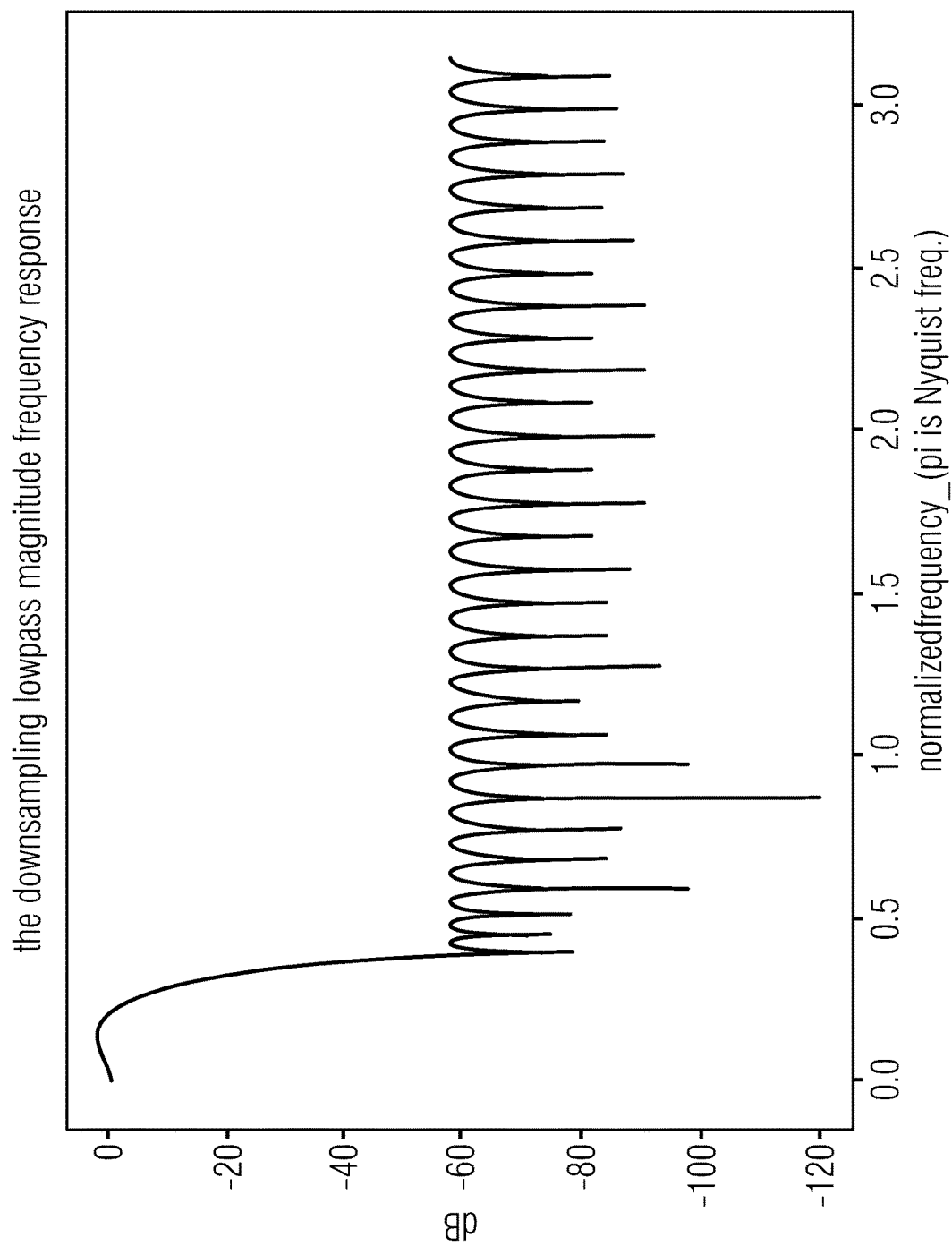

FIG. 6b: Used low pass filter, magnitude frequency response. The x-axis is the normalized frequency, with $2\pi$ being the sampling frequency.

Objective Functions from Low Pass

We can now again plot and compare our objective functions.

Figure 6C:
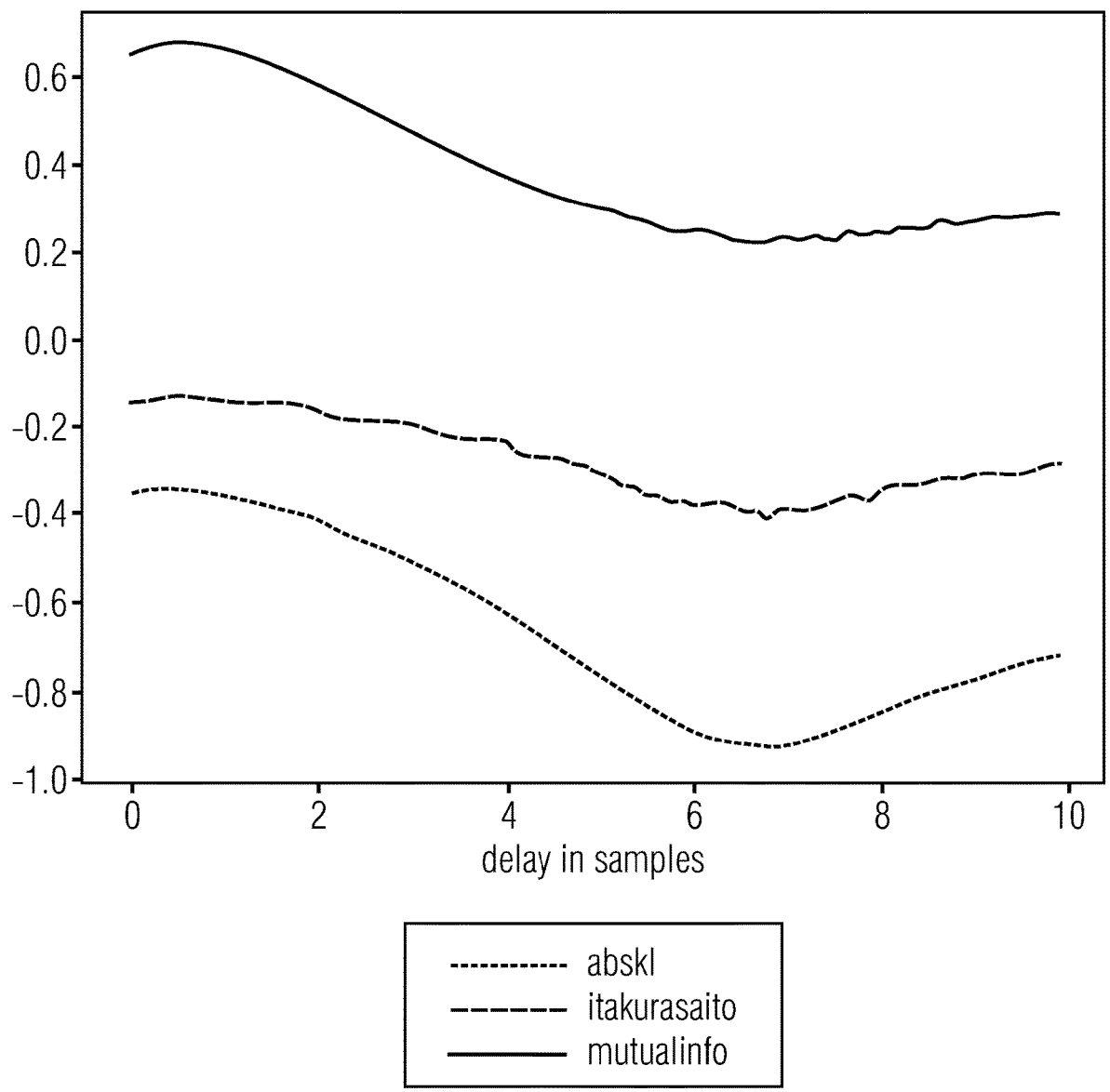

FIG. 6c: Objective functions for the low pass filtered example signal and example coefficients. Observe that the functions now have indeed mainly 1 minimum!

"abskl" is again the smoothest (no small local minima).

Further Speeding Up Optimization, Example

We can now try convex optimization, for instance the method of Conjugate Gradients.

python ICAabskl_puredelay_lowpass.py

Observe: The optimization finished successfully almost instantaneously!

The resulting separation has the same quality as before.

Other Explanations

Above, different inventive examples and aspects are described. Also, further examples are defined by the enclosed claims (examples are also in the claims). It should be noted that any example as defined by the claims can be supplemented by any of the details (features and functionalities) described in the preceding pages. Also, the examples described above can be used individually, and can also be supplemented by any of the features in another chapter, or by any feature included in the claims.

The text in round brackets and square brackets is optional, and defines further embodiments (further to those defined by the claims). Also, it should be noted that individual aspects described herein can be used individually or in combination. Thus, details can be added to each of said individual aspects without adding details to another one of said aspects.

It should also be noted that the present disclosure describes, explicitly or implicitly, features of a mobile communication device and of a receiver of a mobile communication system.

Depending on certain implementation requirements, examples may be implemented in hardware. The implementation may be performed using a digital storage medium, for example a floppy disk, a Digital Versatile Disc (DVD), a Blu-Ray Disc, a Compact Disc (CD), a Read-only Memory (ROM), a Programmable Read-only Memory (PROM), an Erasable and Programmable Read-only Memory (EPROM), an Electrically Erasable Programmable Read-Only Memory (EEPROM) or a flash memory, having electronically readable control signals stored thereon, which cooperate (or are capable of cooperating) with a programmable computer system such that the respective method is performed. Therefore, the digital storage medium may be computer readable.

Generally, examples may be implemented as a computer program product with program instructions, the program instructions being operative for performing one of the methods when the computer program product runs on a computer. The program instructions may for example be stored on a machine readable medium.

Other examples comprise the computer program for performing one of the methods described herein, stored on a machine-readable carrier. In other words, an example of method is, therefore, a computer program having a program-instructions for performing one of the methods described herein, when the computer program runs on a computer.

A further example of the methods is, therefore, a data carrier medium (or a digital storage medium, or a computer-readable medium) comprising, recorded thereon, the computer program for performing one of the methods described herein. The data carrier medium, the digital storage medium or the recorded medium are tangible and/or non-transitionary, rather than signals which are intangible and transitory.

A further example comprises a processing unit, for example a computer, or a programmable logic device performing one of the methods described herein.

A further example comprises a computer having installed thereon the computer program for performing one of the methods described herein.

A further example comprises an apparatus or a system transferring (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some examples, a programmable logic device (for example, a field programmable gate array) may be used to perform some or all of the functionalities of the methods described herein. In some examples, a field programmable gate array may cooperate with a microprocessor in order to perform one of the methods described herein. Generally, the methods may be performed by any appropriate hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] A. Hyvärinen, J. Karhunen, and E. Oja, "Independent component analysis." John Wiley & Sons, 2001.
[2] G. Evangelista, S. Marchand, M. D. Plumbley, and E. Vincent, "Sound source separation," in *DAFX: Digital Audio Effects*, second edition ed. John Wiley and Sons, 2011.
[3] J. Tariqullah, W. Wang, and D. Wang, "A multistage approach to blind separation of convolutive speech mixtures," in *Speech Communication*, 2011, vol. 53, pp. 524-539.
[4] J. Benesty, J. Chen, and E. A. Habets, "Speech enhancement in the SIFT domain," in Springer, 2012.
[5] J. Janský, Z. Koldovský, and N. Ono, "A computationally cheaper method for blind speech separation based on auxiva and incomplete demixing transform," in *IEEE International Workshop on Acoustic Signal Enhancement (IWAENC)*, Xi'an, China, 2016.
[6] D. Kitamura, N. Ono, H. Sawada, H. Kameoka, and H. Saruwatari, "Determined blind source separation unifying independent vector analysis and nonnegative matrix factorization," in *IEEE/ACM Trans. ASLP*, vol. 24, no. 9, 2016, pp. 1626-1641.
[7] "Determined blind source separation with independent low-rank matrix analysis," in *Springer*, 2018, p. 31.
[8] H.-C. Wu and J. C. Principe, "Simultaneous diagonalization in the frequency domain (sdif) for source separation," in *Proc. ICA*, 1999, pp. 245-250.
[9] H. Sawada, N. Ono, H. Kameoka, and D. Kitamura, "Blind audio source separation on tensor representation," in *ICASSP*, April 2018.
[10] J. Harris, S. M. Naqvi, J. A. Chambers, and C. Jutten, "Realtime independent vector analysis with student's t source prior for convolutive speech mixtures," in *IEEE International Conference on Acoustics, Speech, and Signal Processing, ICASSP*, April 2015.
[11] H. Buchner, R. Aichner, and W. Kellermann, "Trinicon: A versatile framework for multichannel blind signal processing," in *IEEE International Conference on Acoustics, Speech, and Signal Processing*, Montreal, Que., Canada, 2004.
[12] J. Chua, G. Wang, and W. B. Kleijn, "Convolutive blind source separation with low latency," in *Acoustic Signal Enhancement (IWAENC), IEEE International Workshop*, 2016, pp. 1-5.
[13] W. Kleijn and K. Chua, "Non-iterative impulse response shortening method for system latency reduction," in *Acoustics, Speech and Signal Processing (ICASSP)*, 2017, pp. 581-585.
[14] I. Senesnick, "Low-pass filters realizable as all-pass sums: design via a new flat delay filter," in *IEEE Transactions on Circuits and Systems II: Analog and Digital Signal Processing*, vol. 46, 1999.
[15] T. I. Laakso, V. Välimäki, M. Karjalainen, and U. K. Laine, "Splitting the unit delay," in *IEEE Signal Processing Magazine*, January 1996.
[16] M. Brandstein and D. Ward, "Microphone arrays, signal processing techniques and applications," in *Springer*, 2001.
"Beamforming," http://www.labbookpages.co.uk/audio/beamforming/delaySum.html, accessed: 2019-04-21.
[18] Benesty, Sondhi, and Huang, "Handbook of speech processing," in Springer, 2008.
[19] J. P. Thiran, "Recursive digital filters with maximally flat group delay," in *IEEE Trans. on Circuit Theory*, vol. 18, no. 6, November 1971, pp. 659-664.
[20] S. Das and P. N. Suganthan, "Differential evolution: A survey of the state-of-the-art," in *IEEE Trans. on Evolutionary Computation*, February 2011, vol. 15, no. 1, pp. 4-31.
[21] R. Storn and K. Price, "Differential evolution—a simple and efficient heuristic for global optimization over continuous spaces," in Journal of *Global Optimization*. 11 (4), 1997, pp. 341-359.
[22] "Differential evolution," http://www1.icsi.berkeley.edu/~storn/code.html, accessed: 2019-04-21.
[23] J. Garofolo et al., "Timit acoustic-phonetic continuous speech corpus," 1993.
[24] "Microphone array speech processing," https://github.com/ZitengWang/MASP, accessed: 2019-07-29.
[25] "Ilrma," https://github.com/d-kitamura/ILRMA, accessed: 2019-07-29.
[26] R. B. Stephens and A. E. Bate, *Acoustics and Vibrational Physics*, London, U. K., 1966.
[27] J. B. Allen and D. A. Berkley, *Image method for efficiently simulating small room acoustics*. J. Acoust. Soc. Amer., 1979, vol. 65.
[28] C. Fevotte, R. Gribonval, and E. Vincent, "Bss eval toolbox user guide," in *Tech. Rep. 1706, IRISA Technical Report* 1706, Rennes, France, 2005.
[29] E. G. Learned-Miller, *Entropy and Mutual Information*. Department of Computer Science University of Massachusetts, Amherst Amherst, MA 01003, 2013.
"Comparison of blind source separation techniques," https://github.com/TUIlmenauAMS/Comparison-of-Blind-Source-Separation-techniques, accessed: 2019-07-29.

The invention claimed is:

1. An apparatus for acquiring a plurality of output signals, associated with different sound sources, on the basis of a plurality of input signals, in which signals from the sound sources are combined,
   wherein the apparatus is configured to combine a first input signal, or a processed version thereof, with a delayed and scaled version of a second input signal, to acquire a first output signal;
   wherein the apparatus is configured to combine a second input signal, or a processed version thereof, with a delayed and scaled version of the first input signal, to acquire a second output signal;
   wherein the apparatus is configured to determine, using a random direction optimization:
   a first scaling value, which is used to acquire the delayed and scaled version of the first input signal;

a first delay value, which is used to acquire the delayed and scaled version of the first input signal;
a second scaling value, which is used to acquire the delayed and scaled version of the second input signal; and
a second delay value, which is used to acquire the delayed and scaled version of the second input signal,
wherein the random direction optimization is such that candidate parameters form a candidates' vector, the candidates' vector being iteratively refined by modifying the candidates' vector in random directions,
wherein the random direction optimization is such that a metrics indicating the similarity, or dissimilarity, between the first and second output signals is measured, and the first and second output signals are selected to be those measurements associated with the candidate parameters associated with metrics indicating lowest similarity, or highest dissimilarity,
wherein the metrics is processed as a Kullback-Leibler divergence.

2. The apparatus of claim 1, wherein the delayed and scaled version of the second input signal, to be combined with the first input signal, is acquired by applying a fractional delay to the second input signal.

3. The apparatus of claim 1, wherein the delayed and scaled version of the first input signal, to be combined with the second input signal, is acquired by applying a fractional delay to the first input signal.

4. The apparatus of claim 1, wherein the first and second scaling values and first and second delay values are acquired by minimizing an objective function.

5. The apparatus of claim 1, configured to:
combine the first input signal, or a processed version thereof, with the delayed and scaled version of the second input signal in the time domain and/or in the z transform or frequency domain;
combine the second input signal, or a processed version thereof, with the delayed and scaled version of the first input signal in the time domain and/or in the z transform or frequency domain.

6. The apparatus of claim 1,
wherein the optimization is performed in the z transform domain.

7. The apparatus of claim 1,
wherein the optimization is performed in the time domain.

8. The apparatus of claim 1,
wherein the optimization is performed in the frequency domain.

9. The apparatus of claim 1, wherein the delay or fractional delay applied to the second input signal is indicative of the relationship and/or difference or arrival between:
the signal from the first source received by the first microphone; and
the signal from the first source received by the second microphone.

10. The apparatus of claim 1, wherein the delay or fractional delay applied to the first input signal is indicative of the relationship and/or difference or arrival between:
the signal from the second source received by the second microphone; and
the signal from the second source received by the first microphone.

11. The apparatus of claim 1, wherein the metrics is acquired in form of:

$$D_{KL}(P\|Q) = \sum_n P(n)\log\left(\frac{P(n)}{Q(n)}\right)$$

wherein P(n) is an element associated with the first input signal and Q(n) is an element associated with the second input signal.

12. The apparatus of claim 1, wherein the metrics is acquired in form of:

$$D(P_0, P_1) = -\sum_n \left[P_0(n)\log\left(\frac{P_0(n)}{P_1(n)}\right) + P_1(n)\log\left(\frac{P_1(n)}{P_0(n)}\right)\right]$$

wherein $P_1(n)$ is an element associated with the first input signal and $P_2(n)$ is an element associated with the second input signal.

13. The apparatus of claim 1, further configured to transform, into a frequency domain, information associated with the acquired first and second output signals.

14. The apparatus of claim 1, further configured to encode information associated with the acquired first and second output signals.

15. The apparatus of claim 1, further configured to store information associated with the acquired first and second output signals.

16. The apparatus of claim 1, further configured to transmit information associated with the acquired first and second output signals.

17. The apparatus of claim 1 and at least one of a first microphone for acquiring the first input signal and a second microphone for acquiring the second input signal.

18. The apparatus of claim 1, configured to sum a plurality of products between:
a respective element of a first set of normalized magnitude values, and
a logarithm of a quotient formed on the basis of:
the respective element of the first set of normalized magnitude values; and
a respective element of a second set of normalized magnitude values,
in order to obtain a value describing a similarity, or dissimilarity, between a signal portion described by the first set of normalized magnitude values and a signal portion described by the second set of normalized magnitude values.

19. The apparatus of claim 18, wherein, for at least one of the first and second input signals, the respective element is based on the candidate first or second outputs signal as acquired from the candidate parameters.

20. The apparatus of claim 19, wherein for at least one of the first and second input signals, the respective element is acquired as a fraction between:
a value associated with a candidate first or second output signal; and
a norm associated with the previously acquired values of the first or second output signal.

21. The apparatus of claim 19, wherein for at least one of the first and second input signals, the respective element is acquired by $$P_i(n) = \frac{|s_i'(n)|}{\||s_i'\||_1} \tag{7}$$

22. A method for acquiring a plurality of output signals associated with different sound sources on the basis of a plurality of input signals, in which signals from the sound sources are combined, the method comprising:
combining a first input signal, or a processed version thereof, with a delayed and scaled version of a second input signal, to acquire a first output signal;
combining a second input signal, or a processed version thereof, with a delayed and scaled version of the first input signal, to acquire a second output signal;
determining, using a random direction optimization, at least one of:
a first scaling value, which is used to acquire the delayed and scaled version of the first input signal;
a first delay value, which is used to acquire the delayed and scaled version of the first input signal;
a second scaling value, which is used to acquire the delayed and scaled version of the second input signal; and
a second delay value, which is used to acquire the delayed and scaled version of the second input signal,
wherein the random direction optimization is such that candidate parameters form a candidates' vector, the candidates' vector begin iteratively refined by modifying the candidates' vector in random directions,
wherein the random direction optimization is such that a metrics indicating the similarity, or dissimilarity, between the first and second output signals is measured, and the first and second output signals are selected to be those measurements associated with the candidate parameters associated with the metrics indicating lowest similarity, or highest dissimilarity,
wherein the metrics is processed as a Kullback-Leibler divergence.

23. The method of claim 22, configured to use an apparatus according to claim 1.

24. The method of claim 22, wherein the fractional delay is indicative of the relationship and/or difference between the delay of the signal arriving at the first microphone from the second source and the delay of the signal arriving at the second microphone from the second.

25. A non-transitory digital storage medium having a computer program stored thereon to perform the method for acquiring a plurality of output signals associated with different sound sources on the basis of a plurality of input signals, in which signals from the sound sources are combined, the method comprising:
combining a first input signal, or a processed version thereof, with a delayed and scaled version of a second input signal, to acquire a first output signal;
combining a second input signal, or a processed version thereof, with a delayed and scaled version of the first input signal, to acquire a second output signal;
determining, using a random direction optimization, at least one of:
a first scaling value, which is used to acquire the delayed and scaled version of the first input signal;
a first delay value, which is used to acquire the delayed and scaled version of the first input signal;
a second scaling value, which is used to acquire the delayed and scaled version of the second input signal; and
a second delay value, which is used to acquire the delayed and scaled version of the second input signal,
wherein the random direction optimization is such that candidate parameters form a candidates' vector, the candidates' vector begin iteratively refined by modifying the candidates' vector in random directions,
wherein the random direction optimization is such that a metrics indicating the similarity, or dissimilarity, between the first and second output signals is measured, and the first and second output signals are selected to be those measurements associated with the candidate parameters associated with the metrics indicating lowest similarity, or highest dissimilarity,
wherein the metrics is processed as a Kullback-Leibler divergence,
when said computer program is run by a computer.

* * * * *